US007711662B2

(12) United States Patent
Buscema

(10) Patent No.: US 7,711,662 B2
(45) Date of Patent: May 4, 2010

(54) SYSTEM AND METHOD FOR OPTIMIZATION OF A DATABASE FOR THE TRAINING AND TESTING OF PREDICTION ALGORITHMS

(75) Inventor: Massimo Buscema, Rome (IT)

(73) Assignee: Bracco Imaging S.p.A., Milan (IT)

( * ) Notice: Subject to any disclaimer, the term of this patent is extended or adjusted under 35 U.S.C. 154(b) by 0 days.

(21) Appl. No.: 10/542,208

(22) PCT Filed: Jan. 13, 2004

(86) PCT No.: PCT/EP2004/000157

§ 371 (c)(1),
(2), (4) Date: Apr. 18, 2006

(87) PCT Pub. No.: WO2004/063831

PCT Pub. Date: Jul. 29, 2004

(65) Prior Publication Data

US 2006/0230006 A1  Oct. 12, 2006

Related U.S. Application Data

(60) Provisional application No. 60/440,210, filed on Jan. 15, 2003.

(51) Int. Cl.
*G06N 3/00* (2006.01)
*G06N 3/12* (2006.01)

(52) U.S. Cl. ....................................................... 706/13

(58) Field of Classification Search .................... 706/1, 706/15, 45, 13, 20, 924, 59; 702/20; 701/106; 700/266; 435/6; 705/3
See application file for complete search history.

(56) References Cited

U.S. PATENT DOCUMENTS 5,708,774 A  *  1/1998  Boden .......................... 714/38

(Continued)

FOREIGN PATENT DOCUMENTS

WO    WO 00/07113 A    2/2000

(Continued)

OTHER PUBLICATIONS

'A Genetic Algorithms Tutorial Tool for NUmerical Function Optimisation': Burke, Varley, 1997, ACM, 0-89791-923, pp. 27-30.*

(Continued)

*Primary Examiner*—David R Vincent
*Assistant Examiner*—Peter Coughlan
(74) *Attorney, Agent, or Firm*—Themis Law

(57) ABSTRACT

A system and method are provided for the training and testing of prediction algorithms. According to an exemplary embodiment of the invention the method generates optimum training, testing and/or validation data sets from a common general database by applying a genetic algorithm to populations of testing and training subsets used in connection with a given prediction algorithm. In exemplary embodiments the prediction algorithm operated upon is an artificial neural network. As well, in preferred exemplary embodiments, the most predictive independent variables of the records of the common database are automatically selected in a pre-processing phase. Such preprocessing phase applies a genetic algorithm to populations of prediction algorithms which vary as to number and content of input variables, where the prediction algorithms representing the selections of input variables which have the best testing performances and the minimum input variables are promoted for the processing of the new generations according to a defined selection algorithm.

28 Claims, 8 Drawing Sheets

U.S. PATENT DOCUMENTS

| | | | |
|---|---|---|---|
| 5,832,466 A * | 11/1998 | Feldgajer | 706/13 |
| 6,177,249 B1 * | 1/2001 | Kwok et al. | 435/6 |
| 2002/0059154 A1 | 5/2002 | Rodvold | |
| 2002/0077756 A1 * | 6/2002 | Arouh et al. | 702/20 |
| 2002/0178132 A1 * | 11/2002 | Rose | 706/20 |
| 2002/0184569 A1 | 12/2002 | O'Neill | |
| 2003/0002690 A1 * | 1/2003 | Breed et al. | 381/86 |
| 2003/0004906 A1 * | 1/2003 | Lapointe et al. | 706/20 |

FOREIGN PATENT DOCUMENTS

| | | |
|---|---|---|
| WO | WO 01/16881 A | 3/2001 |

OTHER PUBLICATIONS

'Scientific Background of Dynamic Adaptive Systems': Buscema, Jan. 11, 2002, Procedings of the Artificial Intelligence meets R&D.*

'Tavola Rotonda, Intelligenza Artificiale e reti neurali: loro utilizzo per ottimizzare diagnosi, prognosi e terapia in pediatria': Bernasconi, Buscema, Street.*

Peck, C. et al. "Genetic algorithm based input selection for a neural network function approximator . . . ", Proced. of the Intl. Con. on Neural Network 1993 vol. 1 p. 1115-1122.

Copy of International Search Report for PCT/EP2004/00157 including Written Opinion of the International Searching Authority.

* cited by examiner

SLIDING WINDOWS GENE REJECTION

GENE HAVING ONLY TWO STATUS g[0;1]

$$\begin{array}{c|cc} \downarrow & 1 & 0 \\ \hline T & 0 & 1 \end{array}$$

GENE HAVING FOUR STATUS g[A; B; C; D]

$$\begin{array}{c|cccc} \downarrow & A & B & C & D \\ \hline T & B & C & D & A \end{array}$$

SYSTEM AND METHOD FOR OPTIMIZATION OF A DATABASE FOR THE TRAINING AND TESTING OF PREDICTION ALGORITHMS

This application is the national stage filing of corresponding international application number PCT/EP2004/000157, filed Jan. 13, 2004, which claims priority from U.S. patent Application Ser. No. 60/440,210, filed Jan. 15, 2003.

TECHNICAL FIELD

The present invention relates to artificial intelligence, and more particularly to a system and method for optimization of a database for the training and testing of a prediction algorithm, such as, e.g., an artificial neural network ("ANN").

BACKGROUND INFORMATION

Modern prediction algorithms are systems that have a high degree of machine intelligence. Machine intelligence can be defined, for example, as the ability to emulate or duplicate in data processing devices the sensory processing and decision making capabilities of human beings. Intelligent systems have the ability, for example, to autonomously learn and adapt in uncertain or partially known environments. It is this feature that has facilitated the commercial acceptance of prediction algorithms.

An artificial neural network (ANN) approach to machine intelligence is based upon the study of the human brain and its emergent properties. Artificial neural networks are generally well known. Such artificial neural networks are data processing systems that have been constructed to make use of some of the organizational principles that are believed to be used by the human brain. In a generic neural network or connectionist model, for example, there are three main components: an artificial neuron, a network topology and a learning algorithm or strategy.

The artificial neurons are processing elements where most of the computation is done. The neurons receive inputs from, for example, other neurons, or from an environment by means of synapses or by interconnection pass outputs to other neurons. The processing elements of an artificial neural network are connected together and overall system behaviour is determined by, for example, the structure and strengths of these connections. A network structure for these elements consists of neurons, or processing elements. The neurons are arranged in groups or layers. Multi-layer systems contain, for example, input and output neurons layers that receive or emit signals to the environment, and neurons which form so called hidden units, which are organised in one or more so-called hidden layer(s). The hidden layers perform non-linear mappings and contribute to the complexity of reliably training a system.

The connections between neurons in different layers propagate signals in one of two ways: feed-forward signals and feedback signals. Feed-forward signals only allow information to flow in one direction. Feedback signals allow information to flow in either direction and/or recursively.

Further, each connected pair of neurons in a neural network has an associated adjustable value or weight. A weight represents the connection strength between a pair of interconnected neurons. The collective weights of all neuronal connections in a neural network are stored in a memory, such as, for example, in a weight matrix.

Learning in an artificial neural network can be defined as any change in a network's memory, or weight matrix. Training a neural network is necessary so that the network will produce a desired output for a given input. Basically, there are two kinds of training or learning of such networks, categorized as unsupervised learning and supervised learning. Unsupervised learning, or self-organization, is a process that does not involve an external teacher. Only local information and internal control strategies are relied upon. Examples of unsupervised learning are implementations of Adaptive Resonance Theory and Hopfield networks.

Supervised learning, on the other hand, relies on an external teacher, such as, for example, a training and testing database. A typical supervised learning algorithm is, for example, back propagation. In particular, supervised training consists of feeding a set of input data to a initialized ANN for which an associated set of one-to-one mapped output data is known. The output data computed by the ANN are then compared with the known output data and the error between the ANN's mapping and the known output data is calculated according to, for example, a distance function or metric. This error is then used to calculate a new weight matrix, or memory, and the training and testing steps are repeated until the desired level of fitness or certainty has been reached, i.e., the error or distance function decreases below a defined threshold.

Supervised training normally uses a training algorithm implementing some optimization techniques which are applied to change the weights or values to provide an accurate mapping. The optimization techniques generally fall within one of two categories, namely stochastic or deterministic techniques.

Stochastic techniques include evolutionary algorithms which help in avoiding leaning instabilities and slowly locate a near global optimum, i.e. a minimum in the error surface, for the weights.

Deterministic methods, on the other hand, such as the well known gradient descent technique, quickly find a minimum but are susceptible to local minima.

Other kinds of learning techniques may be generally defined as error-correction learning. One type of learning technique adjusts a connection weight matrix in proportion to a difference between desired and computed values of each neuron in the output layer. Another example of error-correction learning is reinforcement learning. This is a technique by which weights are reinforced for properly performed actions and diminished for inappropriate ones. Performance of the output layer is captured in a single scalar error value.

These different types of training techniques are disclosed, for example in U.S. Pat. Nos. 6,269,351, 5,214,746, 5,832,446. Each of these patents purports to focus on the training algorithm of an ANN, and purports to improve same.

On the other hand, U.S. Pat. Nos. 6,212,508 and 6,269,351 purport to refer to the problem of appropriate definition of a training and/or testing data set for an ANN. However, in each of these cases, the only problem considered is the selection of a duly representative training set from among a group of data records, not an optimization of a database from which a training data set can be selected.

In general training data selection is a nontrivial task. An ANN is only as representative of the functional mapping it emulates as the data used to train it. Thus, any features or characteristics of the mapping that are not included (or hinted at) within the training data will not be represented in the ANN. Selection of a good representative sample requires analysis of historical data and much trial and error. A sufficient number of points must be selected from each area of the data set that represents or reveals a new or different aspect, behaviour or property of the mapping. This selection is generally accomplished with some form of stratified random sampling, i.e., by defining the various regions and randomly selecting a certain number of points from each region of interest.

Addressing the problem, U.S. Pat. No. 6,269,351 is a system and method for selecting a representative training from a group of data records. Such methods adaptively increase the size of a training dataset during training if a training algorithm fails to reach an intermediate error goal with respect to the entire set of data records. Once an intermediate error goal is reached with respect to the entire data set, a lower error goal is then set and the training algorithm is repeated until the set error goal corresponds to a defined final training state. If not optimally done, in order to include the requisite representative data points to capture the inherent mapping rule the testing set can grow very large, necessitating increased complexity and decreasing the number of data points available for a testing set.

As well, U.S. Pat. No. 6,212,508 purports to disclose a process for conditioning the input variables to a neural network. Such method involves the formation of time series from input variables to the network, where such time series are then subdivided into intervals whose length depends on how far back in time the measured variables contained therein extend. Interval lengths are selected to be larger the further the interval extends back in time. By means of convolution using a bell-shaped function, a representative input value for the neural network is obtained from all the measured variables contained in an interval. Al input variables obtained in this way are fed to the network simultaneously during training and during operation.

None of these approaches, however, refer to the problem of optimizing the distribution of records of a common database into separate training subsets and testing subsets. One of the most difficult problems faced with when training an Artificial Neural Network (ANN) is establishing the size and quality of the training and testing sets. Most of the time, the preset available data set is either too small or too complex to simply be divided into two subsets according to some pseudo-random criterion as is commonly done in known training and testing procedures.

Accordingly, a random distribution of a data set into two or three subsets only makes sense if it is assumed that a simple function represents the overall data set in an optimal way. Generally, however, data are discrete hyper-points of some unknown non-linear function, and this assumption fails.

Furthermore, a pseudo random distribution of all of the available data into a training set and a testing set does not take into account the problem of outliers. The unknown non-linear function can be approximated by a prediction algorithm such as, for example, an ANN.

Thus, a need exists for a method and system to optimize a database for the training and testing of prediction algorithms so as to be able to best approximate an unknown nonlinear function or mapping.

SUMMARY OF THE INVENTION

According to an exemplary embodiment of the present invention a system and method are provided for the training and testing of prediction algorithms. The method generates optimum training, testing and/or validation data sets from a common general database by applying a genetic algorithm to populations of testing and training subset distributions used to process one or more prediction algorithms. In exemplary embodiments of the present invention, the type of prediction algorithm operated upon is an artificial neural network. As well, according to preferred exemplary embodiments of the present invention, the most predictive independent variables of the records of a database are also automatically selected. Such selection process applies a genetic algorithm to populations of prediction algorithms which vary as to number and content of input variables, where the prediction algorithms representing selections of input variables having optimal testing performance with minimum input variables are promoted for the creation of new generations.

DETAILED DESCRIPTION OF THE INVENTION

Figure 1:
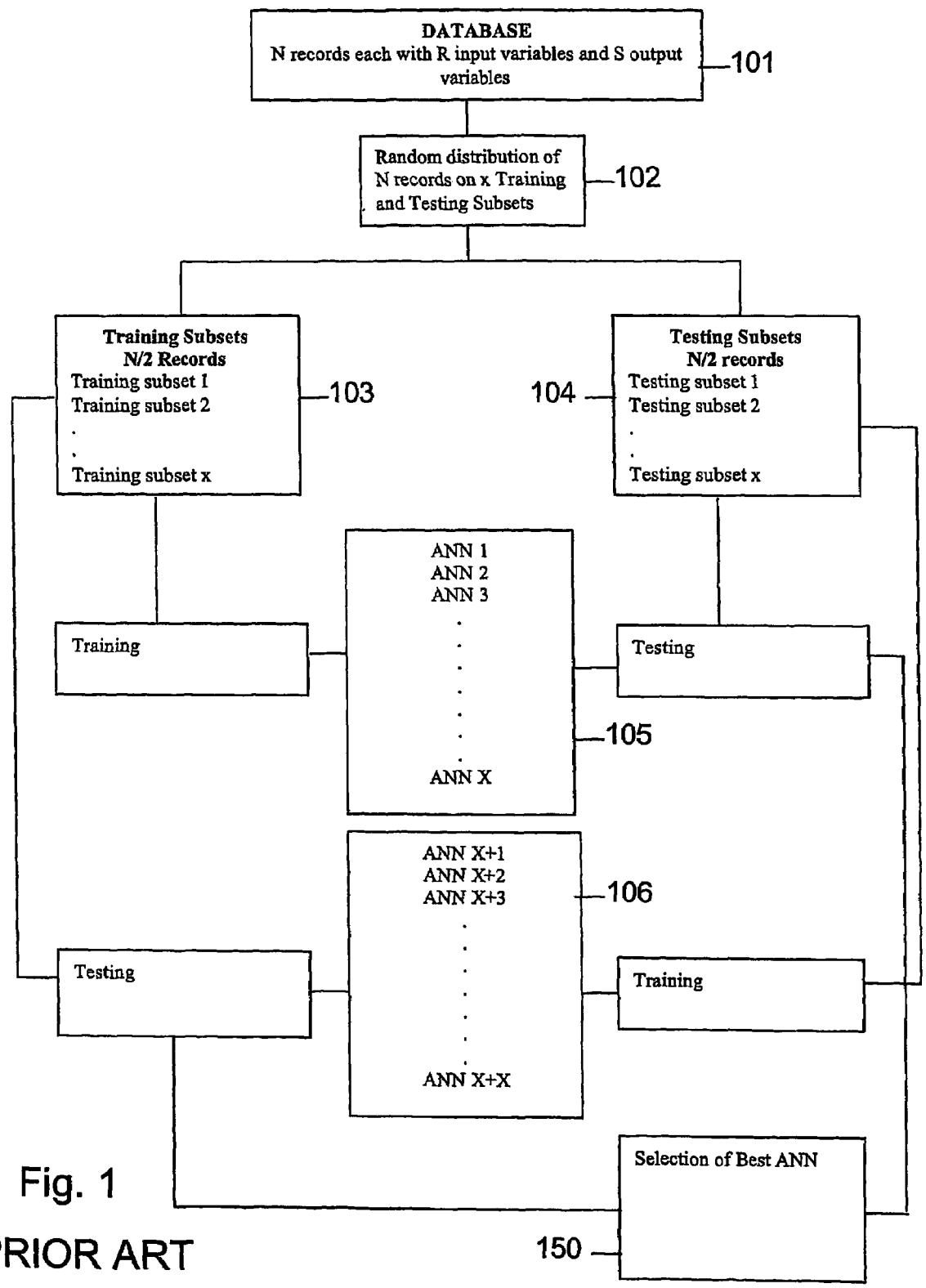
FIG. 1 depicts an exemplary conventional method for distributing records of a complete data set onto a training and a testing dataset.

According to an exemplary embodiment of the present invention, a system and method for training and testing a prediction algorithm may include, for example, a pre-processing phase which is carried out before validation of a prediction algorithm. This preprocessing phase generates a population of prediction algorithms, each of which can be trained and tested using a different distribution of the totality of records in a complete data set into a training data set and a testing data set.

Each prediction algorithm of the population can be, for example, trained according to its own distribution of records of the training set. The prediction algorithm can then be validated in a blind way according to its own distribution of records on the testing set.

In a subsequent testing phase, a score representing the fitness of the prediction algorithm can be calculated.

Further, an evolutionary algorithm can be provided which combines the different models of distribution of the records of the complete data set in a training subset and a testing subset. Each model of distribution is represented by a corresponding prediction algorithm which has been trained and tested using the training and testing data set from that distribution model, and scored according to a fitness score calculated as described above.

The fitness score of each prediction algorithm can represent probability of evolution of each prediction algorithm or of each said distribution of the complete data set on the training and testing data sets.

A finite number of generations for the evolutionary algorithm to operate may be defined by the system or a user, or by indicating a minimum fitness error to be achieved.

Although the methods of the present invention in training, testing and/or validating a prediction algorithm are found to provide better results for any kind of known prediction algorithm, in preferred exemplary embodiments of the present invention an artificial neural network is used.

Also, in exemplary embodiments of the present invention an evolutionary algorithm used to evolve the population of prediction algorithms in order to obtain an optimal distribution of the complete data set onto a training data subset and a testing data subset may be of any known kind.

Evolutionary Algorithms

Evolutionary methods may be organized in such a way as, for example, to imitate natural evolution. These evolutionary algorithms act as general optimization algorithms. Evolutionary algorithms can be employed when it can be determined that one member of a population, or a solution, is more suitable than another. Classical evolutionary methods comprise the following steps: (1) Providing an initial population and applying mutations by randomly changing one or more copies of an original member of the initial population according to predetermined mutations rules or functions; (2) the fitness or best solution of the individuals is then evaluated by means of a function which determines which of the individuals represent the best solution to the problem; (3) the best individuals are selected to take the place of the worst members and until a termination criteria is met, the method returns to the first step.

Genetic algorithms choose a given number of individuals (or genes) from a population (or gene pool), the choice being based on a fitness evaluation. The evaluation is usually comparative and results in an indication of relative fitness. Alternatively, the evaluation may produce scalar results and these results are later used for comparison. Pairs of these individuals may then be mated (via crossover) resulting in further individuals termed "offspring." Alternatively, other forms of population modification may be employed during or between generations. The population may, for example, undergo random alteration (also known as "mutation") which can also produce offspring. Finally, after population modification, at least some of the population can be culled, resulting in a next generation of individuals. Such culling is performed depending upon defined fitness criteria. The genetic algorithm's termination condition can be, for example, a certain number of generations, convergence upon a particular individual in a population, or the reaching of a defined minimum value for some fitness criterion.

"GenD" Type Genetic Algorithms

In an exemplary embodiment, a particular genetic algorithm that can be used is the "Genetic Doping Algorithm." This algorithm is described in detail in M. Buscema, Genetic Doping Algorithm (GenD), Edizioni Semeion, Technical Paper 22e, (Rome 2000); and Massimo Buscema, Genetic Doping and PST a New Mapping System, Year 2001, Edizioni Semeion, Technical Paper 20.

Briefly summarised, the GenD algorithm provides for special modified rules for generating the new individuals of an offspring generation from a parent population.

As is usual for a genetic algorithm, as a first step, GenD calculates the fitness score of each individual of a population, depending on the function that requires optimization. For example, in an exemplary embodiment of the present invention the function requiring optimization may be the distribution function of data records in an original data set onto a training subset and a testing subset. Next, for example, an average health score of the entire population can be computed. The criteria used in calculating average health constitute firstly vulnerability, and secondly recombination, of all of the individuals of a given population, for each generation.

Thus, all individuals whose health is, for example, lower than or equal to the average health of the population are entered onto a vulnerability list. These individuals are not eliminated from the population, but rather continue to take part in the process being only "marked out" or designated and separately tracked. The number of vulnerable individuals in a population, for example, can automatically establish the maximum number of marriages or couplings, permitted for that generation. The number of possible marriages or couplings for each generation thus varies according to the average health of the population.

At a third step, for example, a GenD algorithm couples individuals within a population. The entire population participates in this step. The maximum number of random couplings that may occur corresponds to half of the number of individuals previously marked out as vulnerable.

For coupling purposes and for the generation of children, each of the candidate individuals must have a fitness value that is close to the average fitness value of the entire population Furthermore, each couple may generate offspring, since it is sufficient for marriage that at least one of the two individuals of the couple enjoy health values close to the health average of the entire population or higher. According to, for example, another recombination rule, the GenD algorithm does not consider possible marriages between two individuals where one has a very low health value and the other a very high health value relative to the average health value of the population. Thus means that very weak individuals and very healthy individuals tend not to marry or couple.

In an exemplary embodiment utilizing the GenD algorithm as the evolutionary algorithm, recombination by coupling is not simply a classic crossover of the genes of the individual parents. Rather, the GenD algorithm can effect selective combination of parental genes via two types of recombinations. The first type of recombination is a logic crossover; where repetitions are allowed, and the other is an opportunistic crossover, where repetitions are not allowed.

A logic crossover considers, for example, three cases:
1. The health of the "father" and "mother" individuals are each greater than the average health of the overall population;
2. The health of both parents is lower than the average health of the overall population; and
3. The health of one of the parents is less than the average health, while the health of the other parent is greater than the average health, of the entire population.

According to an exemplary embodiment, if case 1 occurs then recombination can be effected by a traditional crossover. If the second case occurs, the generation of children can occur through rejection of parental genes. If case 3 occurs, then the genes of the more healthy parent can be transmitted to the children, while the genes of the less healthy parent can be rejected.

Figure 7:
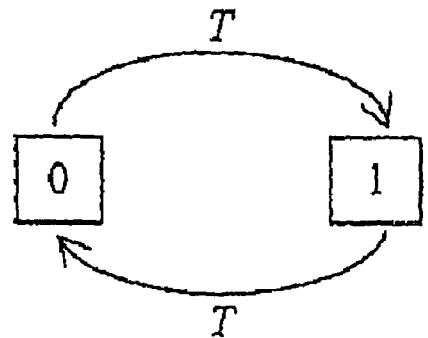
FIGS. 7 and 8 depict two exemplary applications of the Sling Windows Gene Rejection Rule for use in an exemplary genetic algorithm according to an embodiment of the present invention.

As used herein, the term rejection does not mean that the rejected genes are cancelled, but rather that such genes are substituted. Gene substitution is not random but is carried out by means of a sliding window criterion. This is based upon the fact that each gene may have different genetic options or states. In such case, substitution by a sliding window means that the rejected gene will be substituted by the very same gene, albeit in a different state than the original one. Thus, in an exemplary embodiment, during substitution, the criterion used by a GenD type algorithm can provide for the substitution of a state of a given gene by a different state than that which it had in the parent individual. Sliding Window Criteria will be more fully explained in connection with FIGS. 7 and 8, below.

The second type of recombination, opportunistic crossover, can be implemented, for example, when repetitions are not allowed. In such a case, parents have overlapping genes with respect to a random crossover point. An offspring can then be generated by selecting, for example, the more effective gene of the parents. The mechanism can be repeated until all of the offspring are generated.

A further criterion of a GenD type algorithm relies upon a "final opportunity" criterion. Such final opportunity is a mechanism that enables weak individuals previously marked out, and that have never had the opportunity to be part of a marriage, to re-enter the coupling mechanism via the occurrence of a mutation. In exemplary embodiments, the number of possible mutations can be calculated as the difference between the number of potential marriages, i.e. the marriages or couplings among all the individuals of the population and the number of marriages actually carried out. Mutations can occur in those individuals that are present on the vulnerability list and marked out. In this way, individuals that never had the opportunity to be part of a generation process can be given a final opportunity to enter the evolutionary process.

From the above synopsis, in GenD type algorithms the number of marriages and of mutations are not external parameters, but are in fact adaptive self-definable internal variables, which take into account the global tendencies of the population system.

Furthermore, the basic unit of a GenD type algorithm, unlike conventional genetic algorithms, is not the individual, but rather the species. The species as a whole acts on the evolution of individuals via and in response to the average health of the entire population of each generation. Such algorithms are thus wholistic, or put another way, global and systemic. The feedback loop between individuals and the average health of the population enables the algorithm to transform in evolutionary terms the population as a whole from a list of individuals into a dynamic system of individuals.

As well, in exemplary embodiments of the invention a fitness score of each prediction algorithm, for example, an ANN, can be calculated by the evolutionary algorithm itself.

Also, according to an exemplary embodiment of the present invention, the method may include carrying out a further step for calculating the fitness of each prediction algorithm, or individual, as the mean of (a) the fitness calculated using the training data set and the testing data set, and (b) the fitness calculated using the testing data set as the training data set and the training data set as the testing data set.

Figure 4:
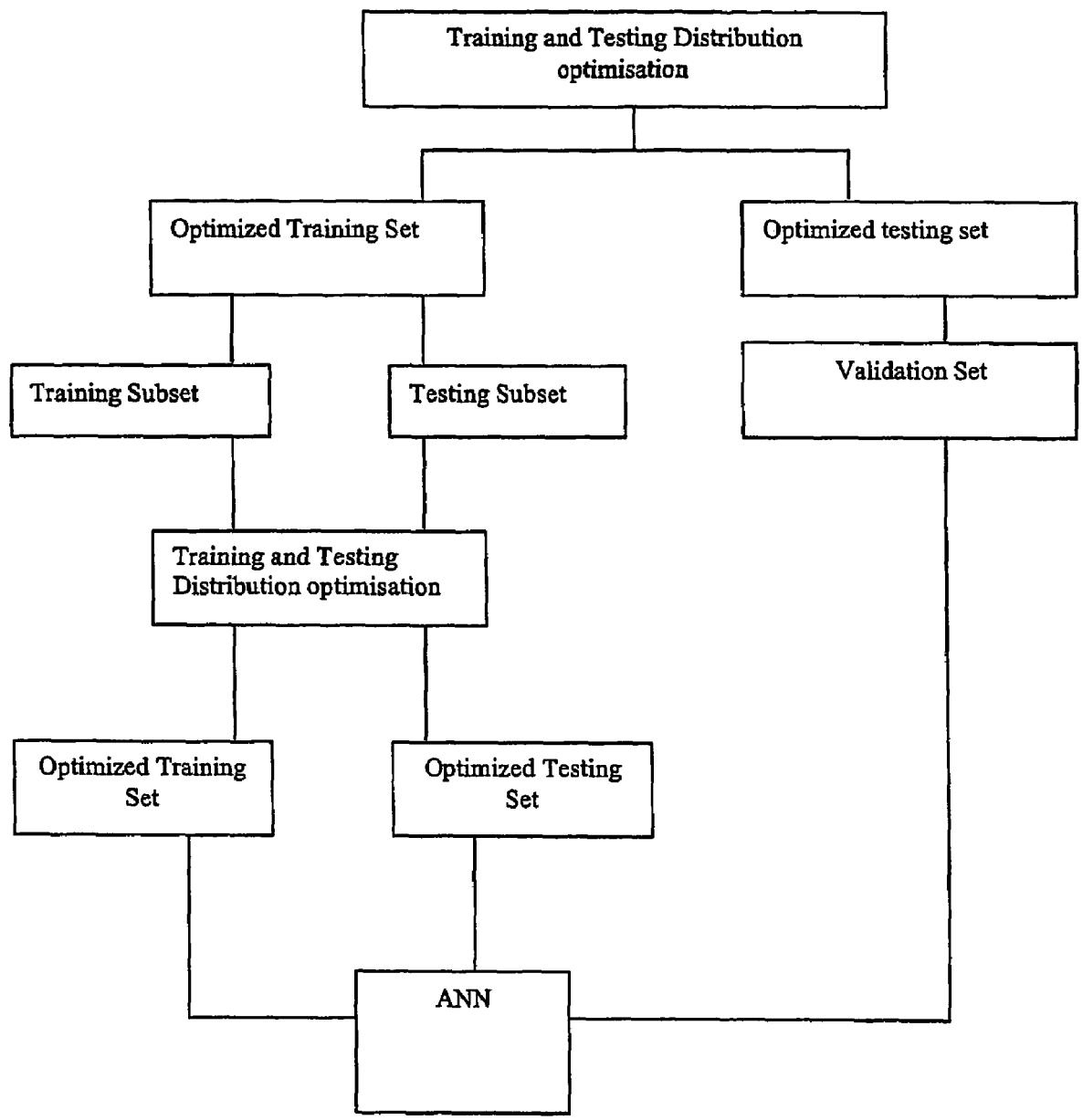
FIG. 4 depicts a further process of the exemplary method depicted in FIG. 2, in which a training data set is further distributed into a new training dataset and a new testing dataset, and the originally optimized training set is used as a validation dataset, according to an exemplary embodiment of the present invention.

Further, according to an exemplary embodiment of the present invention, as depicted in FIG. 4, a pre-processing phase can be carried out in which the best training set obtained is then taken as a complete data set from which data is distributed onto a new training subset and a new testing subset. The new training subset and new testing subset can each comprise 25% of the original complete data set The originally calculated best testing data set may be used as a validation data set and consists of the remaining 50% of the data from the original complete data set.

According to an alternative exemplary embodiment of the present invention, a different approach involving input variable selection may be chosen, which may be carried out alternatively to the optimization of the distribution of the data set onto the training and testing subsets, or in combination with the above described optimization of the distribution of data of the dataset onto training and testing subsets, as a further, or as a parallel preprocessing phase.

This alternative or combined phase is strictly related to the above described pre-processing phase for optimising the distribution of data onto training and testing subsets, in the sense that in this example as well, several prediction algorithms are modeled by means of a specific training set, the records of which are selected from a complete dataset for the training and testing data. Thus, a population of prediction algorithms, particularly ANNs, may be managed by an evolutionary algorithm such as, for example, one of the above described algorithms for the optimization of the training data set. In this case, however, it is not the distribution of records on the training and testing subsets that is optimized, but rather the more predictive independent variables of each record in the training data set. This alternative exemplary embodiment is describe more fully with reference to FIG. 3, below.

One of the difficulties in training predictive algorithms, particularly artificial neural networks, is the need to reduce the number of variables which the algorithm has to consider in order to correctly evaluate the input data. Because the functional relationships that are emulated by a predictive algorithm, such as, for example, an artificial neural network, are very complex relationships where the relation between input variables and output variables and the degree of relevance of given input variables to output variables may be very difficult to discern or define by means of a preventive analysis, it is very difficult to identify dependent or redundant variables or variables that are simply not relevant in the records of a training data set. Thus, normally the entire set of variables is used to train a prediction algorithm This practice has several drawbacks, including, for example, the fact that over-dimensioned input data may lead to worse results in reaching the best fit for a parameter of the prediction algorithm, such as, for example, a weight matrix, or memory, of an ANN.

Thus, according to an exemplary embodiment of the present invention, the most predictive independent variables of the records of a given database are automatically selected by carrying out the following pre-processing phase.

A distribution of data from the complete data set onto a training data set and a testing data set is implemented. These can be done by using a random distribution criterion.

A population of different prediction algorithms is generated, each one having a training and/or testing data set in which only some variables have been considered among all the original variables provided in the dataset, each one of the prediction algorithms being generated by means of a different selection of variables. Selection can be made according to different rules. For example an heuristic method can be applied based on the technical meaning of the data in the database and their relevance. Another criterion of selection can be the so called R2 index, i.e. the linear correlation index of Pearson considering only the data of the dataset which variables has a R2 index value greater than a predetermined threshold value.

Carrying out training and testing of each prediction algorithm of the population and evaluating the fitness score of each prediction algorithm;

Applying an evolutionary algorithm to the population of prediction algorithms for achieving new generations of prediction algorithms;

For each generation of new prediction algorithms representing each new variant selection of input variables, the best prediction algorithm according to the best input variable selection is tested or validated; and A fitness score is evaluated and the prediction algorithms representing the selections of input variables which have the best testing performance with the minimum number of input variables utilized are promoted for the processing of new generations.

Accordingly, an exemplary input variable selection phase used for training and testing data sets may be applied in combination with a method for optimizing the distribution of data from a complete database or dataset onto a training subset and a testing subset.

Thus, in preferred exemplary embodiments of the present invention, optimization of the distribution of data on training and testing subsets can be carried out as a first process, and input variable selection can be carried out as a second process. Such processes are sometimes referred to herein as "pre-processing phases" inasmuch as they are applied of a given prediction algorithm prior to using such algorithm to make predictions regarding actual data. Since the basic algorithms are the same in each of such pre-processing phases it is also possible to carry out both phases in an integrated manner, providing both phases of pre-processing as subroutines of the same overall process.

The methods of the present invention can be implemented in various ways. Such implementations include hardware implantations, software implementations, firmware implementations, or any combination of same. As well, the various methods of the present invention can be implemented across a network or other computer communications channel, and thus various modules implementing one or more sub processes or routines according to the present invention need not be colocational.

FIG. 1 depicts a conventional method for distributing the records of a complete dataset for training and testing a predictive algorithm, such as, for example, an artificial neural network. As illustrated, the dataset comprises a certain number N of records. Each record has, for example, a number of R input variables and a number S output variables which are related by, for example, a non-linear function, a mapping, or some other relational dependence.

The relation of input variables of a record to its output variables, for example, could have been previously defined on an empirical and/or experimental basis. For example, for a number of patients for which it has been discovered that they are either affected or not affected by a certain pathology, different symptomatic variables, diagnostic variables and/or social variables can be collected. Thus, the presence of the pathology or the absence of the pathology can define a status space of the output variables, while the symptomatic variables, diagnostic variables and/or social variables can be considered as input variables.

The conventional method illustrated in FIG. 1 provides for a random distribution 102 of the records of the database 101 onto a training subset 103 and a testing subset 103 for training and testing a certain number of prediction algorithms such as, for example, different kinds of artificial neural networks. The different kinds of neural networks are indicated in FIG. 1 as ANN1 to ANN X 105.

Furthermore, the artificial neural networks, or other kinds of prediction algorithms, can be trained and tested by inverting the each training set with its complementary testing set. The prediction accuracy of the different prediction algorithms thus trained can be evaluated in the testing phase, and thus the prediction algorithm that has received the best score can be selected as the one for predicting the output variables for real world data, i.e., individuals where only the input variables are known.

The inversion phase allows, for example, the system to compensate for possible non-representative distributions of the database records onto training and testing subsets. The prediction accuracy of a particular algorithm, ANN K; can be calculated, for example, as a mean of the scores obtained by that prediction algorithm in a first training and testing phase and in a second training and testing phase in which the training and testing subsets have been inverted. With reference to FIG. 1 the mean of the fitness scores of ANN K and ANN X+K would thus be taken to measure the prediction accuracy of such a distribution.

Obviously, the above illustrated steps may be repeated for more than one random distribution of the complete data set onto training and testing subsets as illustrated in FIG. 1 by, for example, listing differently indexed subsets with an index running from 1 to X. The score obtained by each prediction algorithm may then be evaluated as a mean of the individual scores calculated for each different training and testing data subset.

The conventional method has several drawbacks next discussed. Most of the time the complete data set is too small to be divided into two subsets according to some random criterion. A random distribution of a data set into at least two subsets makes sense only if it is assumed that a simple function represents the data set in an optimal way. Most of the time, however, such data are actually discrete hyper-points of some unknown non linear function. Furthermore, a random or pseudo random distribution of all data into a training and a testing set does not take into account data that are outliers.

Therefore, it is evident that the quality of the prediction model that results from training and testing depends in a significant way on how representative the training subset is, while the performance reliability of the prediction algorithm depends on how representative the testing subset is.

The random distribution of records onto the training and the testing data sets is based, for example, on the assumption that the dataset is holographic; i.e., that it has such completeness that it can be randomly used as a source of new sets, any of which are in turn are representative of the entire universe of the problem which is to be solved by the prediction algorithm, where the complete dataset may thus simulate the probability density function of the process under examination.

Furthermore, when a prediction algorithm, such as for example, an ANN, is used with a random initialization of the weights in a weight matrix, some training strategies which provide for a great number of training and validation steps can cause an artificial variance of the results which is not due to noise in the dataset but rather to the random initialization strategy of the weights.

As well, the classical approach to the distribution of data on training and testing subsets furnishes a result which is an estimation of the possible performance of a class of models, but not of a single model, of a prediction algorithm.

Figure 2:
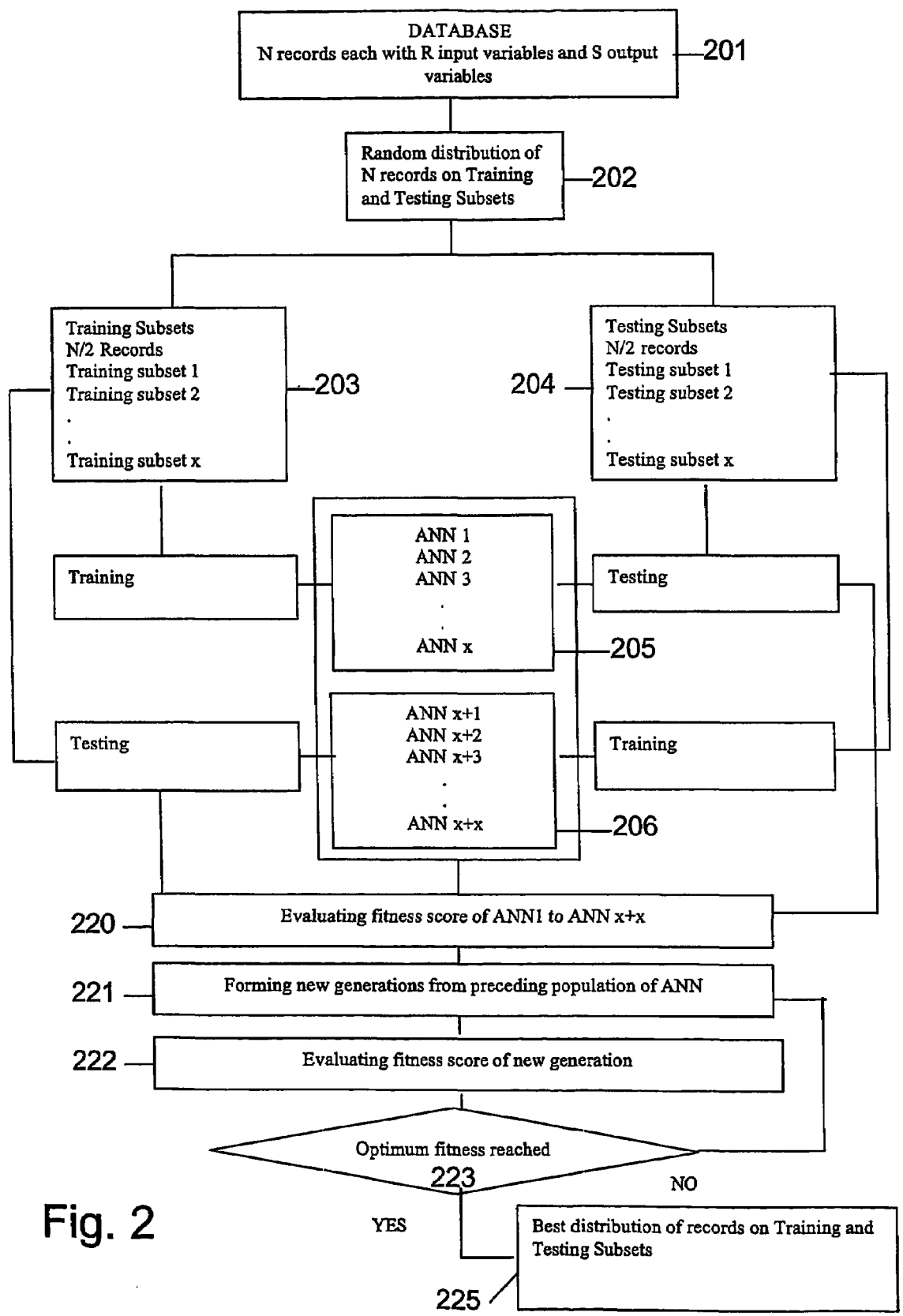
FIG. 2 depicts an exemplary method for optimizing the distribution of records into a training dataset and a testing dataset according to an embodiment of the present invention.

FIG. 2 depicts an exemplary approach according to an embodiment of the present invention for optimizing the distribution of the records of the complete database 201 onto training 203 and testing 204 subsets in such a way so as to obviate the limits of the conventional method discussed in connection with FIG. 1. The starting point is again a complete data set 201 comprising, for example, N records having R known input variables and S known output variables related to the input variables according to some functional, relational or other dependence.

The process of optimization of the distribution begins with a random distribution 202 of the N records onto a training 203 and a testing 204 subset. This step may be repeated several times in order to generate a population of prediction algorithms, for example different artificial neural networks ANN 1 to ANN x 205. Each member of such population is thus trained and tested using a different random distribution of records, indicated in FIG. 2 by the indexed training and testing subsets 1 to x. Training and testing subsets maybe also inverted as described above to generate ANNs x+1 through x+x 206.

This first population of trained and tested prediction algorithms comprises a certain number of prediction algorithms, each one being representative of a certain distribution of the database 201 records onto a training and a testing set.

Further, the population of prediction algorithms can be fed to an evolutionary algorithm such as, for example, a genetic algorithm, which generates from the original parent population 205, 206 a series of generations according to certain rules, which try to emulate the natural genetic development of species, similar to the way in which artificial neural networks try to emulate basic human cognitive functionalities.

An evolutionary algorithm can thus evaluate the fitness of the single prediction algorithms, such as, for example, single artificial neural networks, of a parent population, by calculating the error in predicting the known output variables of the testing sets on the basis of the corresponding input variables of the testing set This process is illustrated in FIG. 2 at 220. Such fitness is referred to as a "fitness score." The fitness score can then be used as one of the basic parameters for defining recombination rules for further generations.

The evolutionary algorithm can provide, for example, for the formation of a "child" generation of prediction algorithms 221, based on a new distribution of records onto the training and testing set, such distribution being obtained by merging or mutating the distribution of records of the parent algorithms. The individuals, namely the single prediction algorithms of this new child generation, can again be evaluated relative to their fitness score, 222 in FIG. 2, and the child population can be used to generate a new "grandchild" population of individuals, or prediction algorithms.

This process is repeated until optimum fitness is reaches 223. Such optimum fitness can be, for example, when a fitness score (defined, for example, as a maximum or average within a given generation) tends to a maximum, when it reaches a previously defined upper limit, and/or when the evolution has proceeded for a defined number of generations.

One or more individuals, i.e. prediction algorithms, with the best fitness score can then be selected and the corresponding distributions of records on the training data subset and on the testing data subset may be used to train and test prediction algorithms for the problem under investigation.

The distribution of records on the training and the testing subsets can be define, for example, as a status vector. Such status vector has a dimensionality or length equal to the number of records N in the complete database 201, and each component of the vector can have one of two possible values, for example, 0 and 1. Each status vector component indicates assignment of that record to one of the two data subsets, namely the training or the testing subset Thus, for example, if N=8 and the status variable is defined as 1 for training and 0 for testing, a value of 1010 1010 indicates records 1, 3, 5 and 7 being assigned to training subset and records 2, 4, 6 and 8 being assigned to the testing subset.

Figure 5:
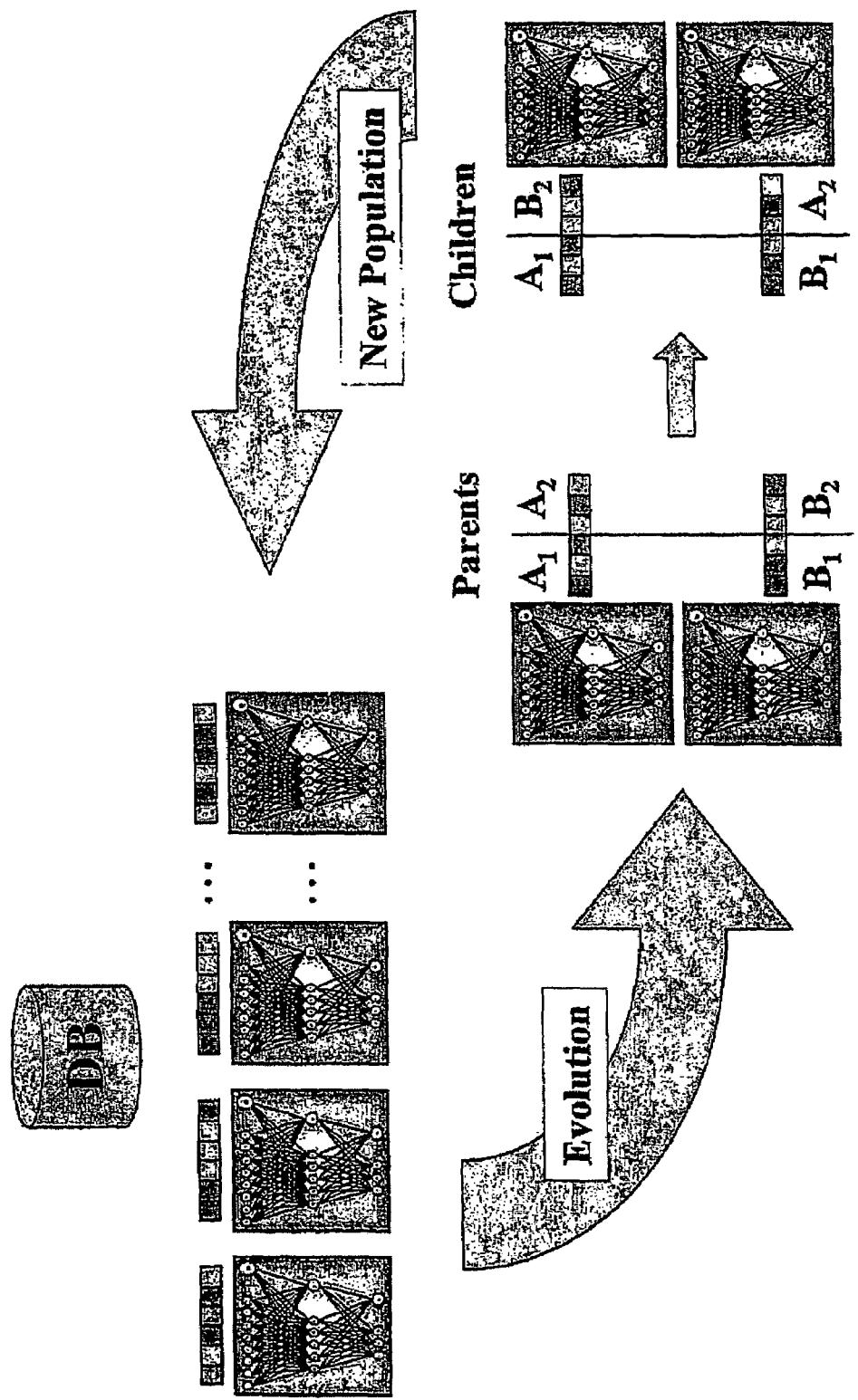
FIG. 5 depicts an exemplary diagrammatical explanation of the exemplary method of FIG. 2 for optimizing the distribution of the records of a complete data set onto a training and a testing dataset according to an exemplary embodiment of the present invention.

FIG. 5 depicts the steps of the above described exemplary method according to an exemplary embodiment of the present invention. In this case, the different prediction algorithms are indicated as artificial neural networks having at least one hidden layer. The two different states of the status variable for each record are indicated by the two different grey levels of the input data. One can, for example, associate a logical "1" with, for example, light grey, and a logical "0" with the dark grey to allow a data processing device to process such status vectors. The records are represented as small squares and the population of artificial neural networks can be used as the starting parent population for an evolutionary process which is carried out by an evolutionary algorithm as described above.

In FIG. 5, a simple crossover law for the genes of two parent ANNs, A and B, each representing a different distribution of records on the training subset and on the testing subset, is shown. The crossover point can be defined by, for example, the evolutionary algorithm. The "genes" can be formed by the components (light or dark) of the status vector for each distribution for each parent ANN (artificial neural network algorithm). The recombination rule can be a classic crossover recombination rule by which the group of genes A2 and B2 of the two parents A and B is crossed in creation of the children ANNs, thus generating new children ANNs which have a new distribution of the records onto the training and the testing subsets. For example, with reference to FIG. 5, parent A has the following "genetic code""010101" and parent B the following "001110." The children are crossovers of the parents, with child AB having genetic code "010110" and child BA having "001101." Thus the first three records of each child's database are assigned as they were in one parent, and the second three assigned as they were in the other parent.

In principle, any known evolutionary algorithm may be used. In an exemplary embodiment of the present invention the Genetic Doping Algorithm GenD can be used.

This particular kind of genetic algorithm has, for example, particular rules for carrying out the evolutionary process, and particularly the gene recombination of the parent individuals. A GenD type algorithm can be characterized firstly by particular rules for allowing marriages between the different individuals of each parent population of prediction algorithms. This rules may be summarised as follows: An average health of the population is defined as a function, taking into account the fitness scores of all the prediction algorithms forming the individuals of the parent population. Individuals whose fitness score or health is lower than or equal to the average health of the entire population are entered in a vulnerability list. Such individuals are not eliminated, but rather "marked out."

Since the entire population of individuals participates in marriages, this means that there can be the coupling of individuals for recombination of genes. For coupling purposes, and for generation of children or offspring, both candidates must have a fitness value close to the average health of the entire population. Furthermore, as another criterion, each couple of individuals can generate offspring if the fitness of one them, at least is greater than the average fitness. Coupling between individuals having a very low fitness value and a very high fitness value are not suitable.

The offspring of each marriage occupy the places of subjects previously entered in the vulnerability list and are marked out so that a weak individual can continue to exist through that individual's children.

A so called final opportunity criterion also can be provided. According to this criterion, the difference of potential marriages and actual marriages defines the number of possible mutations. These mutations may occur in the subjects which are marked out in the vulnerability list and that have never been replaced by children, or offspring, generated by marriages, or couplings. Thus due to mutation, this variable number of weak individuals is given the opportunity to re-enter the evolutionary process.

The recombination between coupled individuals can be effected in a selective way. There are two kinds of recombination allowed. A first kind of recombination is called a logic crossover. This crossover allows for repetitions to occur. A second type of recombination is called an opportunistic crossover, where repetitions are not allowed.

The logic crossover may consider four cases:
1. The health of "father"and "mother" individuals are greater than the average health of the entire population. In this case, the crossover is a classical crossover as shown in FIG. 5.
2. The health of the "father" and "mother" individuals are lower than the average health of the entire population. In this case the offspring are formed through rejection of the parents genes that they would receive by the crossover process.
3. The health of one of the parents is less than the average health of the entire population while the health of the other parent is greater than the average health of the entire population. In this case, only the parent whose health is greater than the average health of the entire population will transmit their genes, while the genes of the parent having a health lower than the average health of the entire population are rejected.

In this genetic algorithm, the rejection of genes does not mean the elimination of the genes. On the contrary, the rejection means their substitution by other status levels that the rejected gene might have according to a principle called "sliding window." This principle is illustrated, for example, in FIG. 7, for the present case of the distribution of records on the training and testing subsets, which genes may assume two status indicated by the numeral 0 and 1. The sliding window means, for example, that if a gene has to be rejected, then the immediately following state for that gene will be used in the genetic domain of the children.

Figure 8:
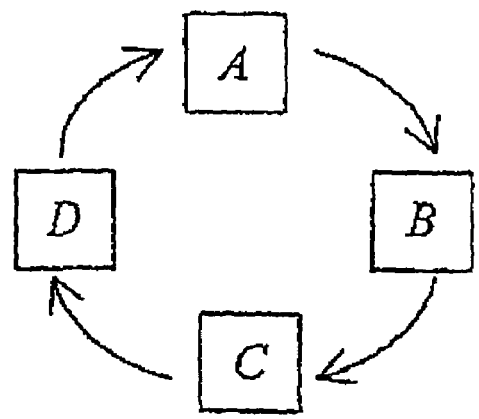

FIG. 8 is an exemplary illustration of the principle of the sliding window in a case where the genes have four status levels indicated by the letters A, B, C, D. In this case, the rejection of a particular gene having the status A would lead to a gene with the status B, from B to C and so on as is indicated by the arrows.

The opportunistic crossover is used when repetitions are not allowed. In this case the parents are overlapped with respect to a random crossover point. Offspring can be generated through the selection of the more effective genes of the parents. This mechanism is repeated until all the genes of the offspring are completed. The particular rules for evolving a starting population through further generations renders the GenD algorithm more like the natural evolutionary process than others.

Input Variable Preprocessing

This new method of pre-processing of the complete training and testing dataset by means of evolutionary algorithms which manage a starting population of prediction algorithm may be also applied, according to an embodiment of the present invention, for selecting among the different variables of each record a set of independent input variables which are most relevant for the prediction process carried out by the prediction algorithm.

Figure 3:
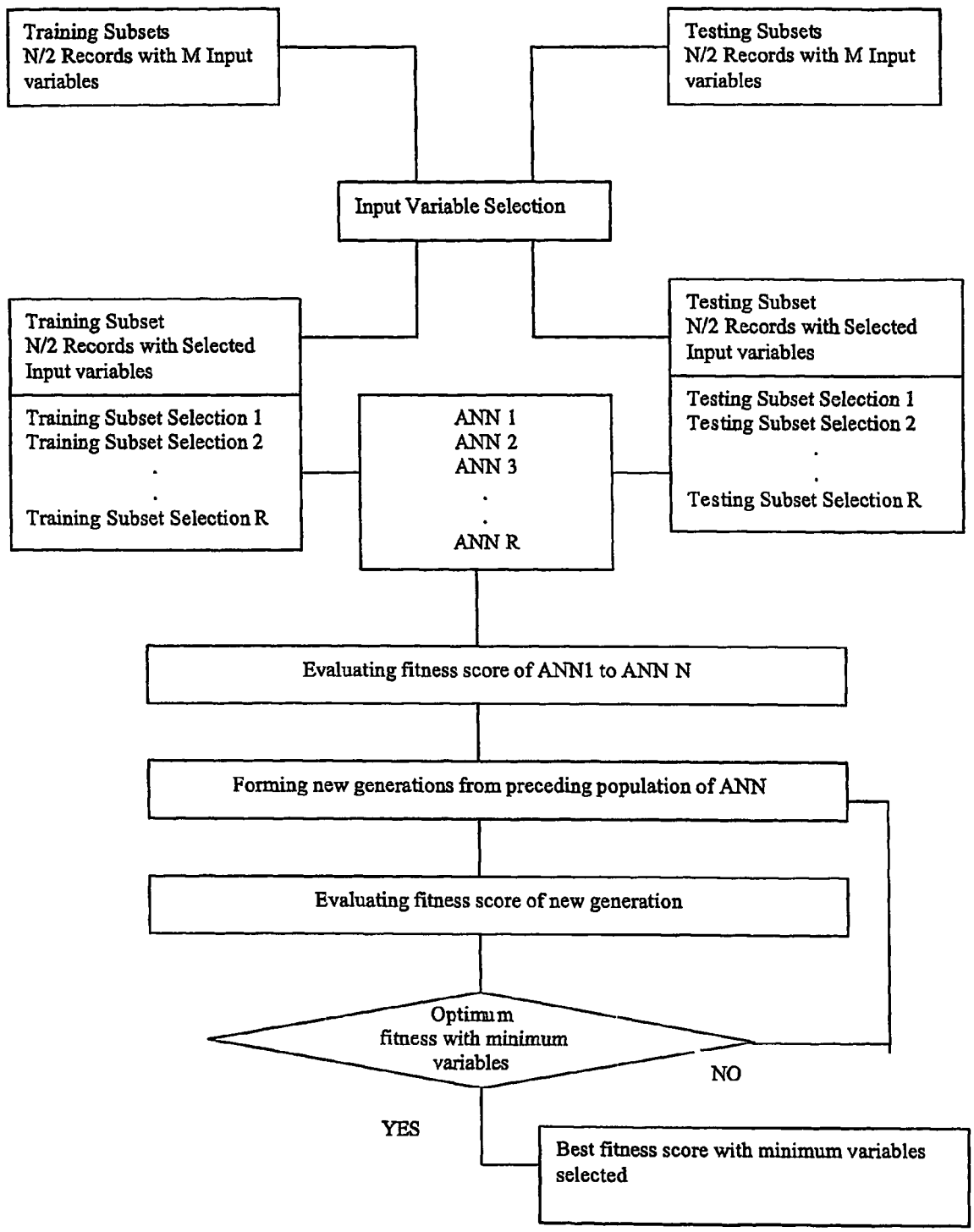
FIG. 3 depicts an exemplary method for selecting the most predictive independent input variables of a database according to an embodiment of the present invention.

FIG. 3 shows an example of this pre-processing method which can be used alternatively or in combination with the above described pre-processing method for optimizing the distribution of records of the complete database onto the two sets for training and testing purposes. In FIG. 3, the distribution in training set and testing set of the data has already been carried out with any kind of method under which the distribution optimization described above may fall.

A population of prediction algorithms or artificial neural networks is generated. The records of the training and testing set for each individual has a different selection of independent variables. This means that some input variables of the complete data set forming each record are left out. Each prediction algorithm, in this case each ANN, learns from the training set and is tested by means of the testing set. The performance of each ANN is evaluated in terms of fitness score as in the above mentioned method according to FIGS. 2 and 5.

To this starting population of prediction algorithms, the evolutionary algorithm such as the above describe GenD or another evolutionary algorithm are applied for forming successive generations. The fitness score of the individuals of each generation created is evaluated in the testing phase and a new generation is created till the fitness score reaches a desired level of reliability, which maybe defined previously in terms of maximum error admitted or as a certain maximum number of generations. The prediction algorithm ultimately selected is the one having the best fitness score with the minimum variables selected. Also, in this case, a status level may be associated with the variables which indicates their admittance in the selected group or their exclusion.

It is important to note in this case and in the previous preprocessing example for optimization of the distribution of the data onto training an testing subsets, that the evolutionary algorithm gives as a result all of the individuals generated and the corresponding selection of input variables, so that it is possible to make comparisons.

This data pre-processing method allows for the reduction of the number of input variables which might over-train the algorithm or over-specify the problem Too large a number of variables also may contribute to generating noise in the prediction process.

It should also be stressed that the selection does not represent only a simple mathematical reduction of variables to the most relevant ones for defining the relationship between input data and output data (solution), but also helps in eliminating input data, the inclusion of which might be costly with respect to other kinds of data. This result will be illustrated more clearly from the following description of a practical example of use of the present pre-processing method.

Figure 6:
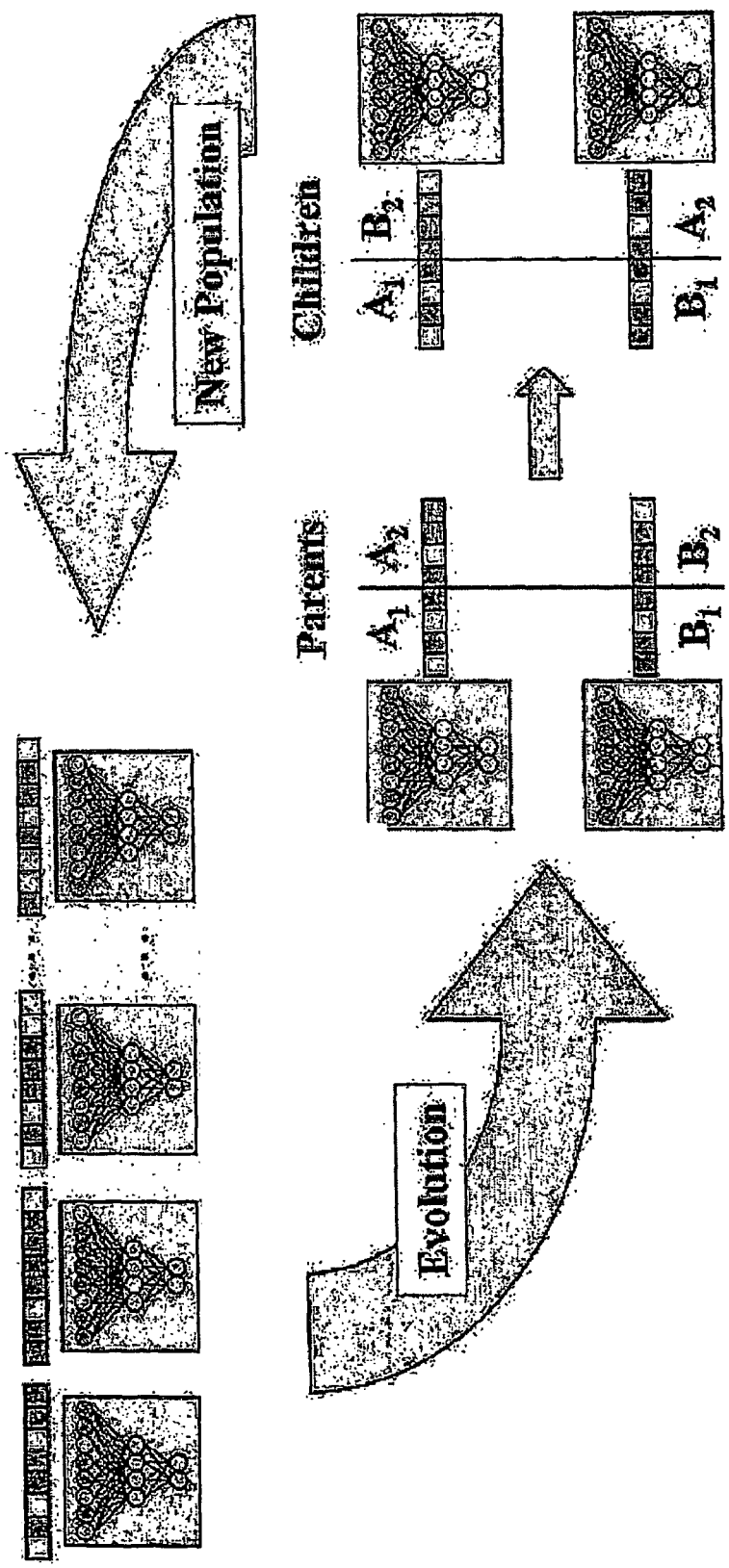
FIG. 6 is an exemplary diagrammatic illustration of the method depicted in FIG. 3 for selection of the most predictive independent input variables according to an embodiment of the present invention.

The pre-processing method is also shown in a similar manner as for the distribution optimization in FIG. 6.

It is further worthy to stress that the two pre-processing methods described may be used in combination and also in any order one with respect to the other.

Many different pre-processing phases may be provided. So, for example, a first phase could consist of an optimization of the distribution of the data records onto the training and testing set. Once the two optimized data sets have been defined, a second pre-processing phase may be carried out which will provide for an appropriate input variable selection according to the method of FIGS. 3 and 6. The so defined new training set may be further processed for optimising the distribution of the records onto a new training set and a new testing set while the testing set may then be used as a third set for blind validation.

An example of this further step is shown in FIG. 4 where the new training set and the new testing set and the validation set are obtained from a training and a testing data set which are the result of an optimization of the distribution of the data records according to the pre-processing step of FIG. 2 and 5. Providing the above mentioned intermediate Input variable selection processing appears evident and would be so understood by a person of ordinary skill in the art from the above description.

EXAMPLE 1

This example deals with the optimization of a data set for Heart Disease patients. Data was collected experimentally and the complete set consists of 270 cases. The target is to predict the presence or the absence of heart disease on the basis of demographic and anamnestic variables and clinical examinations.

The 270 cases represent 150 patients with no heart disease and 120 patients with a diagnosed heart disease. Thirteen independent variables are considered for the classification:
1. Age (real value)
2. Sex (binary)
3. Chest pain type (nominal)
4. resting blood pressure (real value)
5. Serum cholesterol [mg/dl] (real value)
6. Pasting blood sugar>120 mg/dl (binary)
7. resting electro-cardiographic results (nominal)
8. Maximum heart rate achieved (real value)
9. Exercise induced angina (binary)
10. Oldpeak=ST depression indiced by exercise relative to rest (real value)
11. The slope of the peak exercise ST segment (ordered)
12. Number of major vessels colored by fluoroscopy (real value)
13. Thal [normal, fixed defect, reversible defect] (nominal).

The data set is pre-processed according to an exemplary method of the present invention as illustrated in FIGS. 2 and 5. The results are three data subsets presented in Table A.

TABLE A

| Subsets | Number of cases | % of Cases | |
|---|---|---|---|
| Training | 116 | 43 | 58 |
| testing | 40 | 15 | |
| Validation | 114 | | 42 |

A back propagation ANN, with four hidden units was trained and tested on the first two samples and validate on the third.

The following Table B illustrates the results:

TABLE B

| Prediction Algorithm | Recognition rate [%] |
|---|---|
| Back Propagation ANN with optimization | 88.60 |
| Logaritmic regression | 77.00 |
| Bayes neural network | 62.60 |
| Linear Discriminant | 60.70 |
| Logistic Discriminant | 60.40 |

TABLE B-continued

| Prediction Algorithm | Recognition rate [%] |
|---|---|
| Alloc 80 | 59.30 |
| Back Propagation ANN without optimization | 57.35 |

From the above comparison, the improvement of the performance of the back propagation neural network is noted when a pre-processing phase for optimizing the data distribution on training, testing and validation data subsets is carried out (such as is depicted for example, in FIG. 4).

EXAMPLE 2

This example shows the relevance of the pre-processing of data for input variable selection. In this example, Discriminant Analysis and Neural networks where used with the following learning methods:
1. Feed forward back propagation (BP)
2. Auto-recurrent (ARCR) and Cluster-recurrent (TAMS) methods.

The study was based on 350 patients (86 males and 264 females aged between 20 and 81 years). 263 of the patients with a diagnosis of Atrophic Body Gastritis (ABG) and 87 with a diagnosis of non atrophic Body Gastritis. The data set is composed of 40 independent variables, maximized with the aim of obtaining binary answers (presence/absence), including demographic data, clinical history and biochemical parameters. Various methods were used to select the most significant variables for determining diagnostic accuracy.

The following Table C shows the experiments performed:

TABLE C

| Experiment | Nr. of variables | method |
|---|---|---|
| 1 | 40 | Random samples |
| 2 | 38 | 10 randomly selected samples of distribution |
| 3 | 32 | Optimised distribution and Input variable selection according to the present invention |
| 4 | 30 | Excluding of Hp variables |
| 5 | 8 | Selected by discriminant analysis from the 32 of experiment 3 |
| 6 | 5 | Selected from the 8 variables of experiment 5 |

After a preliminary analysis performed on the database with the complete set of 40 variables, the input selection pre-processing method selected 32 variables. Using this input variables the best network produced an accuracy of 99.3% in predicting diagnosis.

The following Table D shows the selection criterion, with the selection score of the variables.

TABLE D

| Input variables selected by the I.S. system: 32 | |
|---|---|
| Variables | R2 |
| 1. Sex | 0.063252 |
| 2. Age | 0.273111 |
| 3. Other derivation | 0.005776 |
| 4. Endocrinology | 0.007744 |
| 5. Dermatology | 0.000182 |
| 6. Gastroenterology | 0.004058 |

TABLE D-continued

Input variables selected by the I.S. system: 32

| Variables | R2 |
|---|---|
| (7. (Hematology) | 0.013179 |
| 8. Other presenting symptom | 0.002098 |
| 9. Endocrinological symptoms/disease | 0.010733 |
| 10. Dermatological symptoms/disease | 0.000182 |
| 11. GI symptoms/disease | 0.014019 |
| 12. Anemia | 0.027291 |
| 13. Months since onset of symptom | 0.100109 |
| (14. No GI symptom) | 0.074693 |
| 15. Other GI symptoms | 0.223729 |
| 16. Ulcer-like dyspepsia | 0.003493 |
| (17. Motility-like dyspepsia) | 0.008630 |
| 18. Neurological symptoms | 0.011088 |
| 19. Other symptoms | 0.302170 |
| 20. $1^{st}$ degr. Family history of autoimmune disease | 0.023256 |
| 21. $1^{st}$ deg. Family history of gastric neoplasms | 0.000102 |
| 22. No $1^{st}$ deg. Family history of DU/GU | 0.002116 |
| (23. $1^{st}$deg. Family history of GU) | 0.013783 |
| 24. $1^{st}$ deg. Family history of DU | 0.000032 |
| (25. Association with thyroid disorder) | 0.040966 |
| 26. Association with dermatological disorder | 0.001063 |
| 27. Association with other neoplasms | 0.004679 |
| 28. Association with DU/GU | 0.019432 |
| 29. Association with other diseases | 0.207480 |
| 30. No anemia | 0.010181 |
| 31. Microcytic anemia (iron deficiency) | 0.199094 |
| 32. Macrocytic anemia (pernicious) | 0.163054 |
| (33. Hemoglobin) | 0.000024 |
| (34. MCV) | 0.120756 |
| 35. Gastrin | 0.237720 |
| 36. Pepsinogen I | 0.267186 |
| 37. Antiparietal cell antibodies | 0.153978 |
| (38. Hp neg. (histology and serology) | 0.006006 |
| 39. Hp pos. serology only (Hp Ab) | 0.119163 |
| 40. Hp pos. (histology and serology) | 0.084972 |

After a preliminary analysis performed on the data, neural networks are subsequently used to work on the eight variables selected in experiment 5 by means of the discriminant analysis.

Such variables are, for example:

| Number of variable | type |
|---|---|
| 2 | Age |
| 13 | Month since onset symptom |
| 15 | Other GI symptom |
| 19 | Other symptom (asthenia) |
| 29 | Association with other diseases |
| 35 | Gastrin |
| 36 | Pepsinogen I |
| 39 | AB anti parietal cell |

From the eight variables listed above, for example, the three laboratory variables can be removed to see whether using discriminant analysis or neural network repeated in twenty consecutive experiments, the diagnosis of ABG can be predicted on the basis of clinical and anamnestic data alone. With this last experiment, discriminant analysis reached 93.18% as the best result out of twenty tests, while the neural network arrived at 99.88%.

From this example, it clearly appears that selecting input variables can help to avoid diagnostic examinations which might be difficult and costly, and that a neural network properly trained by preprocessing the complete data set (a) to optimize the distribution of its records onto training, testing and/or validation subsets; and (b) for selection of the most relevant input variables, can lead to high quality and reliable results.

In the present description, although all the examples have been described in combination with a neural network as a prediction algorithm, in general any predictive algorithm can be utilized.

The method according to the present invention can be in the form of a software program of instructions, which may be executed by an appropriate data processor, as is known in the art. Such a software program may be stored, for example, on a hard drive, flash memory, memory stick, optical storage medium, or other data storage devices as are now known or as may be known in the art When the program is accessed by a CPU of an appropriate data processor and run, it performs, the method of optimizing a distribution of a database into testing and training subsets via an evolutionary algorithm, as well as selection of optimum input variables from the input variables available in said database.

Modifications and substitutions by one of ordinary skill in the art are considered to be within the scope of the present invention which is not to be limited except by the claims that follow.

In order to highlight the technical character of the present invention, one practical example consist in the sound or vocal recognition and in the image recognition. Devices or apparati provided with artificial intelligence features may have input means responsive to acoustic and/or electromagnetic waves. The above definition is directed to the physical nature of the waves and not to their frequency range, since devices can easily be equipped with sensors or receivers, which are responsive to signals within any frequency range, and among these ranges there is also the acoustic frequency range and the electromagnetic wave frequency range, at which the human ear and the human eyes are responsive. In this case a device having artificial intelligence is provided with a processing unit, such as a computer or microprocessor, at least a memory in which a software program is saved, the said program comprising the algorithm or the instructions for carrying out the method according to the invention. A further memory or the same memory for saving the dataset of known variables may be employed. Also input means for the dataset are provided, and furthermore the device has also at least one sensor or more than one sensor responsible to acoustic and/or electromagnetic waves, for example in the optical frequency range as referred to human eyes. The input means can be of any kind such as microphones and wave scanning or sampling units of usual construction, and/or image scanning units such as conventional scanners and/or cameras such as photographic or video cameras and/or input means of image data in the form of an array of digital data obtained by scanning and digitalizing an image. The device can thus be trained to recognize sounds and voices relatively to the kind of source that has generated the sound relatively to the owner of the voice and also to recognize the meaning of the sound and or of a vocal expression. Furthermore, the device can be trained in recognizing the shape of an object reflecting or generating electromagnetic waves, the distance and the meaning of the said object, such as the nature or the kind of object or if the identity of the object, such as the identity of the person having a certain face or morphological appearance.

In this case a database of known data is prepared by correlating univoquely on one side the acoustic signals emitted by one or more objects or one or more living beings making part of the typical environment in which the device has to operate, or the data relating to one or more images of one or more objects or one or more living beings making part of the typical environment in which the device has to operate, and on the other side the kind, and/or the identity and/or the meaning to which the acoustic signals or image data are related and/or from which the acoustic signals or image data are generated. It has to be noted that different kinds of noise or disturbances can affect data, such as acoustic noise due to other sources, like ambient noise and/or different conditions of lighting of the object and/or person when the acoustic and/or image data for the database are generated. Thus the problem of image recognition is not a trivial one.

In order to teach the device or apparatus, the program to which said dataset is fed carries out the method according to the invention in order to optimally train and test the prediction algorithm, which will govern the acoustic and/or image recognition skills of the device. The acoustic and or image recognition processes must be as rapid as possible in order to have the device or apparatus operating rapidly. This is particularly important when a device or apparatus is concerned of the kind called robot or the like which operates in a natural environment, where fast reaction times are normally required.

A further example of a system based on the method according to the present invention consists in a specialized system for image pattern recognition having artificial intelligence utilities for analyzing a digitalized image, i.e. an image in the form of a array of image data records, each image data record being related to a zone or point or unitary area or volume of a two or three dimensional visual image, a so called pixel or voxel of a visual image, the visual image being formed by an array of the pixels or voxels and utilities for indicating for each image data record a certain quality among a plurality of known qualities of the image data records. The system has a processing unit as for example a conventional computer, a memory in which an image pattern recognition algorithm is stored in the form of a software program which can be executed by the processing unit, a memory in which a certain number of predetermined different qualities which the image data records can assume has been stored and which qualities have to be univoquely associated to each of the image data records of an image data array fed to the system, input means for receiving arrays of digital image data records or input means for generating arrays of digital image data records from an existing image and a memory for storing the digital image data array, output means for indicating for each image data record of the image data array a certain quality chosen by the processing unit in carrying out the image pattern recognition algorithm in the form of the software program. The image pattern recognition algorithm is a prediction algorithm in the form of a software program, which prediction algorithm is further associated to a system being further provided with a training and testing software program. The system is able to carry out training and testing according to the method of the present invention. This method is provided in the system in the form of the training and testing software program, a database being also provided in which data records are contained univoquely associating known image data records of known image data arrays with the corresponding known quality from a certain number of predetermined different qualities which the image data records can assume.

In the different examples of systems described above, in alternative to or in combination with the method for optimizing the training and testing of the prediction algorithm according to the present invention which is in the form of a software program, the above described method for carrying out an independent variable selection of the data records in the database for training and testing can be carried out in this case also is in the form of a software program stored in a memory of the system and executable by the processing unit.

From a general point of view the system according to the invention comprises an apparatus or device for generating an action of response which is autonomously, i.e. by itself, chosen among a certain number of different kinds of actions of response stored in a memory of the apparatus or autonomously generated by the apparatus basing the said choice of the kind of action of response on the interpretation of data collected autonomously by means of one or more sensors responsive to physical entities or which are fed to the apparatus by means of input means, said interpretation being made by means of a prediction algorithm in the form of a software saved in a memory of the apparatus and being carried out by a central processing unit. The apparatus is further provided with means for carrying out a training and testing phase of the prediction algorithm by inputting to the prediction algorithm data of a known database in which input variables of the input data representing the physical entities able to being sensed by the apparatus through the one or more sensors and/or able to be fed to the apparatus by means of the input means are univoquely correlated to at least one definite kind of action of response among the different kinds of possible action of response, the means for carrying out the training an testing being in the form of a training and testing software saved in a memory of the apparatus. According to the invention, the software program corresponds to the method of the present invention according to one or more combinations and sub combinations of steps previously described which method is in the form of a software program or instructions.

Figure 9:
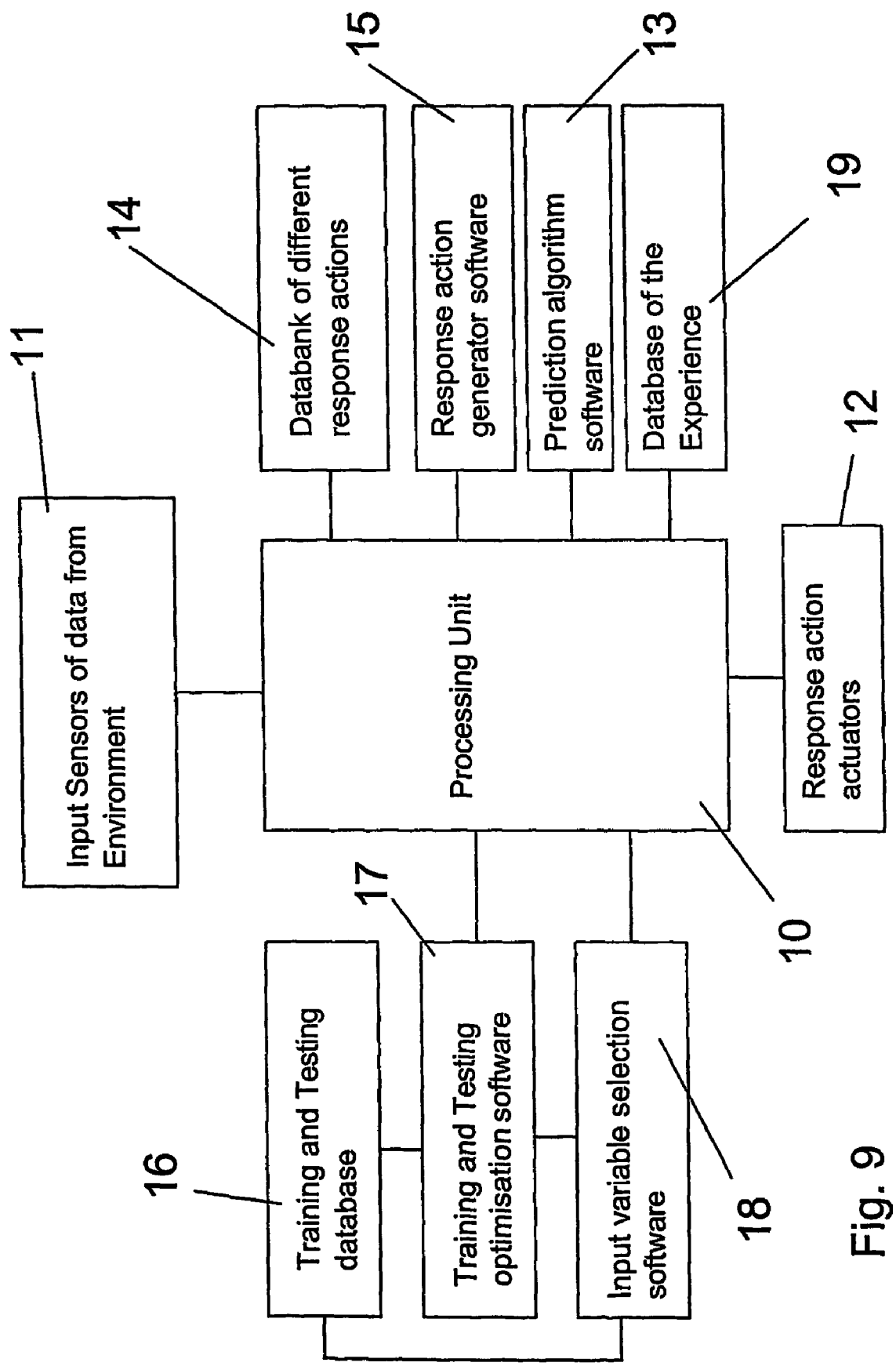
FIG. 9 is a schematic diagram of an apparatus having artificial intelligence and operating according to the method of the present invention.

FIG. 9 illustrates schematically an apparatus of the kind disclosed above. The apparatus has a central processing unit 10, such as a CPU or a conventional computer system. Signals corresponding to physical effects such as sound, electromagnetic waves or other kind of effects are generated by sensors 11 which are designed to be responsive to such physical effects or events. The apparatus is expected to output a certain response action chosen autonomously on the basis of the signals sensed by the sensors 11. The response actions are carried out by one or more response action actuators 12 which can be means for carrying out mechanical actions and/or means for generating acoustic or visual signals and/or means for transmitting or receiving signals or means for carrying out any other action. The kinds of action are chosen by means of an artificial intelligence algorithm such as a prediction algorithm or a genetic algorithm or other actually known algorithms which is stored in the form of a software program in a memory 13 or in a memory area of a memory. The different response actions are stored in a memory 14 or in a memory area from which the corresponding software program for carrying out the actions can be retrieved by the processing unit or alternatively the different actions can be generated by the processing unit 10 in carrying out a response action generator algorithm in the form of a software program stored in a memory 15 or in another memory area. The artificial intelligence algorithm, for example a prediction algorithm, has to be initialized by teaching and testing procedures. In a memory 16 or in a memory area a Training and Testing database is provided. The Training and testing database can be also inputted by means of input devices such as a storage media reader in which a storage media is inserted, on which the training a testing database is stored. The database is submitted alternatively or in combination and in whichever order of sequence to an optimization of the distribution of the database records onto a training and a testing database by means of an algorithm in the form of a software program, which operates according to the method of the present invention. The software program is stored in a memory or in a memory area 17 and is retrieved there-from and carried out by the central processing unit 10. Similarly also the input selection option is in the form of a software program stored in a memory or in a memory area 18. The central unit can access also this software program and carry out the same for executing an input variable selection on the different independent variables of the training and testing database records. Finally, the input data sensed by the sensors and the performed specific response action can be stored in a memory or in a memory area 19 in the form of a database of experience. This database can also include reactions of the environment to the response action carried out which can be associated to a value in order to have also a measure of the success of the response action autonomously chosen and carried out by the apparatus.

A further example of the method according to the invention is related to the optimization of the training and testing dataset in combination with an intensive use of the input variable selection. The method according to the invention in this case is applied for determining genes which are relevant for a biological condition or a pathologic condition and particularly to a method for preparing so called DNA Microarray for genetic test purposes.

The recent developments in genetics and genomic researches has given the possibility of widely mapping the genoma of biological tissues and of vegetal, animal and human individuals. Of most genes which has been individuated only a limited function is known. Furthermore the effects of the said genes is not completely known relating to a correlation to biological conditions of the tissues or as a cause for a pathological condition or for the potential risk of development of pathological conditions.

The correlation of a particular genotype, in the sense of the presence of particular genes and/or polymorphisms thereof to a biological or pathological condition may furthermore depend on different combination of genes or polimorphysms thereof being present or absent in the genotype of an individuum. This renders the individuation of the genotype correlated to a certain biological or pathological condition more complex and difficult.

Recently it has been demonstrated that the pathogenesis of most diseases is a process which is influenced by a complex interaction of genetic and environmental factors which generally are referred to as "risk factors". While since long time studies on the environmental factors has been made, the genetic factors could be taken into consideration only in recent times.

For determining a set of genes and of the polymorphisms thereof which might be relevant as so called "risk factors" for a biologic or pathologic condition DNA microarrays or so called biochips has been developed. Such DNA microarrays and their use are disclosed for example in "DNA microarrays in medical practice" by Timothy J Aitman published in Clinical REwiev Volume 323, Sep. 15, 2001 which includes a disclosure about structure and way of producing DNA microarrays.

This DNA microarrays allow to determine a genetic map of the genoma of an individuum or of a tissue DNA relating to a large number of genes and of the polymorphisms thereof.

Such maps, giving information about the genes or polymorphisms thereof comprised in the genoma of the tissue or of the individuum can be brought in relation to a specific biological condition of the tissue for example relating to the development of tumoral cells and/or to a specific kind of disease or pathological condition or to a risk factor of developing such specific disease or pathological condition of the individuum.

Normally however the number of genes and polymorphism considered is relatively high and the choice of the said genes and polymorphisms is made on the basis of theoretical argumentations and of the known function of the genes.

A further selection and the consequent reduction of the number of genes and of the polymorphisms thereof that has to be considered relevant for a certain biological condition and/or a certain pathologic condition can be made by considering a very large population of samples or cases in which the presence or absence of the said certain biologic or pathologic condition is sure or conclamated and by applying statistical mathematical methods such as logistic regression or multinomial logistic regression for testing the association of a certain gene or polymorphisms thereof and the presence or absence of the said certain biologic or pathologic condition. Other statistical methods used for selecting specific genes or polymorphisms or mutation or functionally equivalent genes thereof comprise for example also the linear correlation index of Pearson typically indicated as a value R2.

Such methods as for example disclosed in the publications "Scoring Genes for Relevance" by Amir Ben-Dor, Nir Firedman and Zohar Yakhini and "Gene Chips Inch Toward the Clinic" by Brian Vastag, allow a certain reduction in the number of genes and of polymorphisms thereof that might be considered relevant for a certain biologic or pathologic condition within a relatively high probability.

This reduction however is limited by the intrinsic limitation of the statistic instruments that require a very high number of cases in order to furnish a reliable result. So the number of relevant genes of polymorphisms thereof cannot be further reduced by this means, a further reduction requiring further experimental research or enlargement of the number of cases in a database which is very expensive and time consuming.

The still high number of genes having a sufficient probability of being relevant for a biologic or a pathologic condition renders the genotyping of individuals for evaluating the risk factor still time consuming and expensive and also the related microarrays or biochips has still high costs. Thus the use of DNA microarrays for evaluating the probability of developing biologic condition of a tissue or a certain pathologic condition of an individual is still limited almost to research and has not jet be considered as a standard inspection or evaluation method.

Furthermore it has to be noted that the results of a reduced number of genes or polymorphisms thereof obtained by means of the statistical mathematical methods are in principle not useful for fishing reliable information on a single tissue sample or a single individuum, since they always furnish results which has to be related to a population of samples and a population of individuals.

The method according to the present invention can be used either for selecting a limited number of genes among a given larger number of genes provided on the microarray and being determined as having a suspected relevance for evaluating the probability of developing biologic conditions of a tissue or a certain pathologic condition of an individual or other biologic characteristics of the tissue or of am living being.

Thus the following sequence of steps can be carried out:
a) providing a database of experimentally determined data in which each record relates to a known clinical or experimental case of a sample population of cases and which records comprise a certain number of input variables corresponding to the presence/absence of a certain predetermined number of polymorphisms and/or mutations and/or equivalent genes of a certain number of theoretically probable relevant genes and one or more related output variables corresponding to the certain biological or pathologic condition of the said clinical and experimental cases of the sample population;

b) determining a selection of a reduced number of the certain predetermined number of polymorphisms and/or genes by testing the association of the said genes or polymorphisms and the biological or pathological condition by means of mathematical tools applied to the database.

c) The said mathematical tools comprise a so called prediction algorithm such as a so called neural network, and the further steps are carried out of d) dividing the database in a training and a testing dataset for training and testing the prediction algorithm;

e) defining two or more different training dataset each one having records with a reduced number of the input variables which reduced number of input variables is obtained by excluding one or more input variables from the originally defined number of input variables, while for each record the reduced number of input variables of the corresponding training set has at least one input variable which is different from the input variables of the reduced number thereof of the other training datasets, each different input variable consisting in a different gene or a different polymorphisms and/or a different mutation and/or a different functionally equivalent gene thereof of the originally considered genes or polymorphisms and/or mutations and/or functionally equivalent genes thereof considered theoretically potentially relevant for the biologic or pathologic condition;

f) training the prediction algorithm with each of the different training sets defined under point e) for generating a first population of different prediction algorithm which are divided into two groups of mother and father prediction algorithms and testing the said prediction algorithms with the associated testing set;

g) calculating a fitness score or prediction accuracy of each father and mother prediction algorithms of the said first population by means of the testing results i) providing a so called evolutionary algorithm such a genetic algorithm and applying the evolutionary algorithm to the first population of mother and father prediction algorithms for achieving new generation of prediction algorithms whose training and testing dataset comprises records whose input variables selections are a combination of the input variable selections of the records of the training and of the testing datasets of the first or previous population of father and mother prediction algorithms according to the rules of the evolutionary algorithm;

j) for each generation of new prediction algorithms, representing each new variant selection of input variables, the best prediction algorithm according to the best hypothesis of input variable selection is tested or validated by means of the testing dataset;

k) a fitness score is evaluated and the prediction algorithms representing the selections of input variables which have the best testing performance with the minimum number of input variables utilized are promoted for the processing of new generations;

l) repeating the steps i) to k) until a predetermined fitness score defined as best fit of the prediction algorithm and a minimum number of input variables has been reached;

m) defining as the selected relevant input variables i.e. as the relevant genes or polymorphisms and/or of mutations and/or of functionally equivalent genes thereof the ones related to the input variables of the selection represented by the prediction algorithm having both at least the predetermined fitness score and also the minimum number of selected input variables.

It is to be noticed that in the above combination of steps no optimization of the distribution of the records of the original database in a training and in a testing database has been carried out. This optimisation can be carried out as a pre processing or post processing phase, i.e. before carrying out the steps e) to m) at step d) or after having carried out the steps a) to m). The optimisation of the distribution of the data records in a training and testing set is carried out preferably according to the method steps of the present invention.

The above optimisation as a preprocessing or post-processing step comprises the use of an evolutionary algorithm for generating form a first staring population of prediction algorithms such as the neural networks which are trained and tested by means of different training and testing datasets each one of them corresponding to a different randomized distribution of the records of the complete database on a training and on a testing dataset.

The methods according to this further optimisation comprises the steps of defining a set of one or more distributions of the database records onto respective training and testing subsets;

using the defined set of distributions to train and test a first generation set of one or more prediction algorithms and assigning a fitness score to each;

feeding the set of prediction algorithms to an evolutionary algorithm which generates a set of one or more second generation prediction algorithms and assigns a fitness score to each; and continuing to feed each generational set of prediction algorithms to the evolutionary algorithm until a termination event occurs;

where said termination event is at least one of a prediction algorithm is generated with a fitness score equalling or exceeding a defined minimum value, the maximum fitness score of successive generational sets of prediction algorithms converging to a given value, and a certain number of generations having been generated.

According to a more specific embodiment the said preprocessing phase comprises the following steps:

generating a population of prediction algorithm each one of them is trained and tested according to a different distribution of the records of the data set in the complete database onto a training data set and a testing data set;

each different distribution being created by a random or pseudo-random distribution;

each prediction algorithm of the said population is trained according to its own distribution of records of the training set and is validated in a blind way according its own distribution on the testing set;

a score reached by each prediction algorithm is calculated in the testing phase representing its fitness;

an evolutionary algorithm being further provided which combines the different models of distribution of the records of the complete data set in a training and in a testing set which sets are represented each one by a corresponding prediction algorithm trained and tested on the basis of the said training and testing data set according to the fitness score calculated in the previous step for the corresponding prediction algorithm;

the fitness score of each prediction algorithm corresponding to one of the different distributions of the complete data set on the training and the testing data sets being the probability of evolution of each prediction algorithm or of each said distribution of the complete data set on the training and testing data sets;

Repeating the evolution of the prediction algorithm generation for a finite number of generations or till the output of the genetic algorithm converges to a best solution and/or till the fitness value of at least some prediction algorithm related to an associated data records distribution has reached a desired value;

Setting the data records distribution for the best solution as the optimized training and testing subsets for training and testing prediction algorithm It is important to notice that the said pre-processing phase might be carried out also as a post-processing phase after the input variable selections steps has been carried out and a reduced number of relevant input variables, i.e. of genes and/or polymorphisms thereof has been determined.

The above input variables selection method with or without a pre or post processing phase for optimising the distribution of the database records on the training and on the testing set of the prediction algorithm allows to drastically reduce the number of input variables, namely the number of genes and/or of polymorphisms and/or of mutations and/o of functionally equivalent genes thereof to be considered to be relevant for predicting the "risk" of a certain biological condition for example in tissue and/or of a certain pathologic condition of an individual patient.

Thus a DNA microarray or biochip as a tool for genotyping the genoma of tissue cells and/or of an individual patient, this means for revealing the presence or absence of the selected relevant genes and/or polymorphisms and/or of mutations and/or of functionally equivalent genes thereof needs to contain a very small number of genes and/or polymorphisms and/or mutations and/or functionally equivalent genes thereof and is less expensive and more easy to produce and requests less time for evaluation.

According to a further step which might be provided in combination with the above disclosed input variable selection method applied to the selection of the most relevant genes, and/or polymorphisms and/or of mutations and/or of functionally equivalent genes, a step of evaluating the linear correlation index of Pearson (so called R2) is carried out This step might be provided as a parallel step to the above mentioned method for selecting the relevant input variables or as a first preselection step, which reduces statistically the number of the input variables to be treated by the selection method disclosed above.

When the R2 index is calculated as a parallel step, for selecting the relevant input variables set, the input variables which are selected as the most relevant input variables might be chosen as the ones which are common to the set of selected input variables determined by the above disclosed selection method and to the set of input variables having the best R2 index.

For carrying out such combined step of selection by means of the two mathematical methods also different kinds of statistical algorithm or index might be used.

Using the method according to the present invention it is thus possible to provide an Examination or Diagnostic Kit comprising a DNA microarray on which only the DNA or RNA sequences are provided which are complementary to the DNA or RNA sequences of the genes and/or polymorphisms and/or mutations and/or functionally equivalent genes thereof that have been determined as being relevant for a certain biologic or pathologic condition according to the method disclosed above and a program saved on a carrier which program consists in at least one prediction algorithm trained and tested with a limited number of input variables corresponding to all or to at least part of the DNA or RNA sequences provided on the DNA Microarray, which program has to be loaded on a conventional computer and run after the input of the data on the presence or absence in the genoma of the tissue cells or of the individual of each one or of at least part of the DNA or RNA sequences provided on the biochip.

The following is an example of the method described above. The aim is to prepare a microarray for genotyping individuals of a population relatively to the presence or absence of certain genes or polymorphisms which are theoretically related to certain biologic conditions, such morphology, pathologies or risks of developing certain pathologies or biologic conditions. Actually using theoretical scientific knowledge a certain number of polymorphisms of genes has been individuated and a list of them has been generated. A case study has been carried out in which the genoma of individuals of which the biologic condition is known has been analyzed relating to the presence and absence of the said polymorphisms and a known database is generated. The said database is considered to be the database from which the training and testing datasets has to be generated with the method according to the present invention and which records has to be subjected to independent input variable selection. In this case the input variables of such data records are considered to be the single polymorphisms which can be associated with a value indicating the presence or absence of a certain polymorphism of the list of polymorphisms in the genoma of an individuum. The output variable associated to the said input variable is the presence or absence of the biologic condition.

The following table illustrates an experiment carried out with 65 polymorphysms as input variables. The kind of the polymorphisms is irrelevant relatively to the result. The 65 input variable were associated to two output variables indicating the presence and absence of a certain biologic condition according to the definition given above of this term.

| DB | Expe | Nr of Input variable selected | Nr. of Output | Nr. of Individuals | Distribution criterion on training and testing dataset | variable selection criterion and variable selected |
|---|---|---|---|---|---|---|
| Complete DB | 1 | 64 | 2 | 438 | Random | All the input variables See table 1 |
|  | 2 | 64 | 2 | 439 | Optimized | All the input variables See table 1 |
|  | 3 | 11 | 2 | 439 | Optimized | 11 variables selected among the ones common to a set of selected input variables determined with the method according to the invention comprising the combination of neural networks populations and evolutionary algorithm and to a |

-continued

| DB | Expe | Nr of Input variable selected | Nr. of Output | Nr. of Individuals | Distribution criterion on training and testing dataset | variable selection criterion and variable selected |
|---|---|---|---|---|---|---|
| | 4 | 11 | 2 | 439 | Random | set of input variables whose R2 index is greater than the mean R2 index<br>Same variable selection criterion and same variables selected as in expe 3 |
| | 5 | 11 | 2 | 439 | Optimized | 11 variables selected with the method according to the invention comprising the combination of neural networks populations and evolutionary algorithm |
| | 6 | 6 | 2 | 439 | Random | 6 variables which are common to the variables selected in experiment 3 or 4 and 5 |
| | 7 | 6 | 2 | 439 | Optimized | same variables selected as in experiment 6 |
| | 8 | 5 | 2 | 439 | Random | variables selected with the method according to the invention comprising the combination of neural networks populations and evolutionary algorithm from a starting reduced set of 11 variables whose R2 index is greater than the mean R2 index |
| | 9 | 5 | 2 | 439 | Optimized | Same variables as in experiment 8 |
| | 10 | 3 | 2 | 439 | Optimized | 3 variables |
| | 11 | 3 | 2 | 439 | Optimized | Genetic variable having the highest R2 index in the set selected in experiment 2 and 4 |
| Subgroup | 12 | 65 | 2 | 255 | Optimized | Complete database comprising two further variables |
| | 13 | 29 | 2 | 255 | Optimized | 29 variables selected from the 65 with the method according to the invention comprising the combination of neural networks populations and evolutionary algorithm |
| | 14 | 9 | 2 | 255 | Random | 9 variables selected under the variables common to a set of variables selected with the method consisting in the combination of neural networks and evolutionary algorithm and a set of variables having a R2 index greater than the mean R2 index |
| | 15 | 9 | 2 | 255 | Optimized | 9 variables selected as in experiment 14 |

The following table illustrates the results of the above experiments.

| DB | Expe | Number of Repetion of computation | Back Propagation Neural Network | LogReg Stepwise | LogReg Total |
|---|---|---|---|---|---|
| COMPLETE DB | 1 | 30 | 63.55% | 68.37% | |
| | 2 | 8 | 72.38% | 72.96% | |
| | 3 | 50 | 72.89% | 70.51% | 71.02% |
| | 4 | 56 | 77.54% | 73.49% | 72.28% |
| | 5 | 26 | 75.54% | 74.40% | 76.21% |
| | 6 | 20 | 75.31% | | |
| | 7 | 28 | 78.37% | | |
| | 8 | 50 | 75.97% | 71.28% | 72.73% |
| | 9 | 12 | 80.50% | | |
| | 10 | 8 | 74.98% | | |
| | 11 | 16 | 77.21% | 73.49% | 72.28% |
| SUB GROUP | 12 | 4 | 75.17% | | |
| | 13 | 4 | 81.29% | | |
| | 14 | 40 | 76.55% | 68.81% | 68.69% |
| | 15 | 52 | 84.37% | | |

In table 3 the results in term of fitness score of the prediction is listed for the above mention cases and referred to a traditional back propagation neural network. The results have been expressed in terms of mean values obtained by a certain number of repetition of the computation. The number of computations is indicated in a dedicated column. In some cases there were the possibility of comparing the fitness score of the neutral network with the fitness score of a logarithmic regression computed on the same set of input variables as the ones used for the neural network. Two kind of regression was carried out in parallel or alternatively a stepwise regression and a total regression. From the above tables it clearly appears that a better fitness score has been obtained by the stepwise logarithmic regression only in experiment 1 where the complete set of 64 input variables has been considered in the records of the database and where a non optimized, random distribution of the records onto a training and a testing set was chosen. Experiment 2 where also 64 input variables were considered but in which an optimization of the distribution according to the present invention has been carried out as a further processing step shows similar results in the predictive capacity of the neural network and of the logarithmic regression algorithm. In all the other experiments, 3 to 13 when a logarithmic regression of either one of the both kinds has been carried out the fitness score obtained by the neural network trained and tested with a dataset of records having very few input variables has a better fitness score than the logarithmic regression algorithm. It is also of interest the fact that the fitness scores of the neural network trained and tested with the dataset whose records comprise only few input variables of the complete number of input variables are decisively better than the fitness scores of the neural network or of the logarithmic regression algorithm trained and tested with a training and a testing dataset comprising all the input variables available. Furthermore it appears clearly form the tables above that the method according to the invention cannot be considered a diagnostic method since comparable results in the fitness score of the prediction has been obtained with different numbers and different kinds of input variables. In any case the method according to the invention is a strong tool in reducing the number of genes or polymorphisms or the like that has to be put on a microarray having the aim of providing information about the presence or absence of the said genes, the said polymorphisms or the like in the genoma of an individuum for predicting a biologic condition.

According to experiment 9 where a fitness score of 80.50% was reached only five input variables need to be considered. This means that a DNA microarray is needed providing the DNA or RNA sequences of only five genes or polymorphisms or the like. Experiment 13 reaches a better fitness score of 84.37% by considering four more input variables. A DNA microarray or a biochip having so a limited number of sequences may be produced at very low costs as compared to the complete set of input variables related to 35 genes and 65 polymorphisms thereof.

Advantageously the said microarray may be part of a kit comprising the already trained and tested neural network or a group of already tested and trained neural networks in form of a computer program on a carrier such as a floppy disk or a CD. The said program may be loaded in a conventional computer and used for computing a prediction of the risk of thrombosis of an individual patient on the basis of the presence or absence of the genes or polymorphisms. This information is obtained by genotyping the genoma of the individual patient by means of the said microarray in the known and conventional way.

Further to the fact that the method according to the invention has revealed that better results where obtained with a reduced set of input variables selected from the complete database in various manner, as indicated in the above tables, it is also interesting to view that the highest fitness scores where reached in experiment 9 and 15. Particularly experiment 9 has a selected input variables set comprising only five variables which have been selected by applying the combined selection method according to the invention on an already reduced input variables set. This preventive input variables selection step is based on a different algorithm and in this case on the R2 index.

It is to be noted that although the method according to the invention and the microarray and the diagnostic kit has been disclosed only with reference to a biologic condition of an individual it might be also applied for predicting a biologic condition of tissue cells. In the diagnostic branch this might be used for example in order to predict if tumoral cells will develope methastasis.

What is claimed:

1. A computer medium of sound or image recognition comprising:
   one or more sensors or receivers responsive to signals;
   a computer operatively coupled to the one or more sensors, the computer comprising a central processing unit;
   one or more memories, at least one of the one or more memories storing a software program comprising the steps of:
      defining a plurality of distributions of known database records onto respective training and testing subsets;
      training and testing a first generation set of prediction algorithms using the plurality of distributions of the database records, each of said prediction algorithms being associated with a first different distribution of said database records;
      assigning a fitness score to each of the prediction algorithms;
      feeding the set of prediction algorithms to an evolutionary algorithm which generates a set of one or more second generation prediction algorithms and assigns a fitness score to each;
      continuing to feed each generational set of prediction algorithms to the evolutionary algorithm until a termination event occurs, wherein said termination event is at least one of;
      a prediction algorithm generated with a fitness score equal to or exceeding a defined minimum value,
      the maximum fitness score of successive generational sets of prediction algorithms converging to a given value, or
      a certain number of generations having been generated;
      selecting a prediction algorithm having a best fitness score; and
      using the distribution of database records associated with said selected prediction algorithm in performing supervised learning, said supervised learning including training and testing of prediction algorithms to obtain a trained prediction algorithm;
      generating a population of prediction algorithms, wherein each of said prediction algorithms is trained and tested according to a second different distribution of the records of the data set in the complete database onto a training data set and a testing data set,
         each second different distribution being created as one of a random or pseudorandom distribution,
         each prediction algorithm of said population being trained according to its own distribution of records of the training set and being validated in a blind way according its own distribution on the testing set, and
         a score reached by each prediction algorithm being calculated in the testing phase representing its fitness;
      providing an evolutionary algorithm which combines the different models of distribution of the records of the complete data set in a training and in a testing set, which sets are represented each one by a corresponding prediction algorithm trained and tested on the basis of said training and testing data set according to the fitness score calculated in the previous step for the corresponding prediction algorithm,
      the fitness score of each prediction algorithm corresponding to one of the different distributions of the complete data set on the training and the testing data sets being the probability of evolution of each prediction algorithm or of each said distribution of the complete data set on the training and testing data sets;

repeating the evolution of the prediction algorithm generation for a finite number of generations or till the output of the genetic algorithm converges to a best solution and/or till the fitness value of at least some prediction algorithm related to an associated data records distribution has reached a desired value; and setting the data records distribution for the best solution as the optimized training and testing subsets for training and testing prediction algorithm; and an output system providing an indication of the signals detected by the one or more sensors.

2. The computer medium according to claim 1, wherein the software program further comprises the step of associating a distribution variable to each record of the data set, which is binary and which has at least two statuses, one of the two statuses being associated with the inclusion of the record in the training set and the other one of the two statuses in the testing set.

3. The computer medium according to claim 1, wherein the prediction algorithm is an artificial neural network.

4. The computer medium according to claim 1, wherein the prediction algorithm is a classification algorithm.

5. The computer medium according to claim 1, wherein once an optimum distribution has been computed, the optimized training data subset is made equal to a complete data set, the individuals included in the training subset being distributed onto a new training set and onto a new testing set each having about half of the records of the original optimized training set, while the originally optimized testing set is used as a third data subset for validation purposes.

6. The computer medium according to claim 5, wherein the distribution of the data of the originally optimized training set onto the new training and new testing set is optimized through a pre-processing phase including the steps of said method for optimizing a database of sample records, said records being records in the originally optimized training set.

7. The computer medium according to claim 1, wherein different choices of the structure of the training subset and the structure of the testing subset comprise different selections of the number of input variables of the data records of the database, which selections include leaving out at least one variable from the entire input variable set forming each record, the records of the database comprising a certain number of known input variables and a certain number of known output variables.

8. The computer medium according to claim 7, further comprising the following steps:

defining a distribution of data from the complete data set onto a training data set and onto a testing data set;

generating a population of different prediction algorithms each one having a training and/or testing data set in which only some variables have been considered among all the original variables provided in the data sets, each one of the prediction algorithms being generated through a different selection of variables;

carrying out learning and testing of each prediction algorithm of the population and evaluating the fitness score of each prediction algorithm;

applying an evolutionary algorithm to the population of prediction algorithms for achieving new generations of prediction algorithms;

for each generation of new prediction algorithms, representing a new different selection of input variables, testing or validating the best prediction algorithm according to the best hypothesis of input variables selection; and evaluating a fitness score and promoting the prediction algorithms, representing the selections of input variables which have the best testing performances and the minimum input variables, for the processing of the new generations.

9. The computer medium according to claim 7, further comprising a preprocessing phase, including the steps of said method for optimizing a database of sample records, for selecting the most predictive input variables.

10. The computer medium according to claim 1, in which different choices of the structure of the training subset and the structure of the testing subset comprise different selections of the number of input variables of the data records of the database, which selections include leaving out at least one, variable from the entire input variable set forming each record, the records of the database comprising a certain number of known input variables and a certain number of known output variables, and further comprising a pre-processing phase, including the steps of said method for optimizing a database of sample records, for selecting the most predictive input variables, wherein the database subjected to the pre-processing phase of input variable selection is a training subset and a testing subset processed with said method.

11. The computer medium according to claim 1, wherein the complete database the distribution of the records of which has to be optimized has data records having a selected number of input variables, the selection being carried out with said method, and wherein different choices of the structure of the training subset and the structure of the testing subset comprise different selections of the number of input variables of the data records of the database, which selections consist in leaving out at least one variable from the entire input variable set forming each record, the records of the database comprising a certain number of known input variables and a certain number of known output variables.

12. The computer medium according to claim 1, wherein a pre-processing phase for optimizing the distribution of the records on a training subset and a testing subset and for selecting the most predictive input variables, is carried out alternatively one to the other several times.

13. The computer medium according to claim 1, wherein the evolutionary algorithm is a genetic algorithm with the following evolutionary rules:

an average health value of the population is computed as a function of the fitness values of each single individual in the population;

coupling, recombination of genes and mutation of genes are carried out in a differentiated manner depending on a comparison between the fitness of each individual of the couple and the average health value of the entire population to which the individuals belong;

individuals having a fitness value lower or equal to the average health of the entire population are not excluded from the creation of new generations but are marked out and entered in a vulnerability list; and the number of subjects entered in the vulnerability list defines the number of possible marriages.

14. The computer medium according to claim 13, wherein for coupling purposes and for generation of children at least one parent individuals must have a fitness value greater than the average health value of the population.

15. The computer medium according to claim 13, wherein each couple of individuals are adapted to generate offsprings having a fitness different from the average health if the fitness of one them at least is greater than the average fitness, the offsprings of each marriage occupying the places of subjects entered in the vulnerability list and marked out, so that a weak individual can continue to exist through his own children.

16. The computer medium according to claim 13, wherein coupling between individuals having a very low fitness value and a very high fitness value are not allowed.

17. The computer medium according to claim 13, wherein the following recombination rules of the genes of the coupled parent individuals are considered in the case the parents individuals have no common genes:
the health of father and mother individuals are greater than the average health of the entire population;
the crossover is a classical crossover according to which the genes of the father and of the mother individuals are substituted one with the other starting from a certain crossover point;
the health of father and mother individuals are lower than the average health of the entire population, in this case the two children are formed through rejection of the parents' genes they will receive by the crossover process;
the health of one of the parents is less than the average health of the entire population while the health of the other parent is greater than the average health of the entire population, in this case only the parents whose health is greater than the average health of the entire population will transmit their genes, while the genes of the parent having an health lower than the average health of the entire population are rejected.

18. The computer medium according to claim 17, wherein each gene is characterized by a status level, and wherein gene rejection comprises modifying the status of the genes from one status level to a different status level.

19. The computer medium according to claim 17, wherein a modified crossover of the genes of the parent individuals is carried out when the parent individuals have part of the genes that coincide, this modified crossover providing for generating an offspring in which the genes selected for crossover are the most effective ones of the parents.

20. The computer medium according to claim 13, wherein the individuals are the different prediction algorithms representing a corresponding different initial random distribution of data records onto the testing and the training data set, and wherein the genes consist in the binary status variable of association of each record to the training and to the testing subset.

21. The computer medium according to claim 13, wherein the individuals are the prediction algorithms each one representing a different training and testing data set, the difference residing in a different selection of input variables for each different training and testing subset, and wherein the genes comprise a different selection variable which is provided for each input variable in the different training and testing subsets, the selection variable being a parameter indicating the presence/absence of each corresponding input variable in the records of each data set.

22. The computer medium according to claim 1, wherein the output is an indication of a shape of an object generating or reflecting electromagnetic waves, and/or the distance and/or the identity of the object.

23. The computer medium according to claim 1, wherein the known database records comprise acoustic signals emitted by one or more objects or one or more living beings making part of a typical environment in which the method is performed or data relating to one or more images of one or more objects or one or more living beings that are part of the typical environment, and/or identity and/or meaning of objects to which the said acoustic signals or image data are related and/or from which said acoustic signals or image data are generated.

24. The computer medium according to claim 22, wherein the computer medium is a specialized system for image pattern recognition having artificial intelligence utilities for analyzing an image in the form of a array of image data records, each image data record being related to a zone or point or unitary area or volume of a two or three dimensional visual image, the visual image being formed by an array of pixels or voxels and utilities for indicating for each image data record a certain quality among a plurality of known qualities of the image data records;
wherein the one or more sensors or receivers receive arrays of digital image data records or generate an array of digital image data records from an existing image;
wherein at least one of one of the one or more memories stores said digital image data array, and
wherein the output system indicates for each image data record of the image data array a certain quality chosen by the processing unit in carrying out the image pattern recognition algorithm in the form of the said software program.

25. The computer medium according to claim 1, wherein the signals are electromagnetic waves in the acoustic or visible range.

26. The computer medium according to claim 1, wherein the software program further comprises a preprocessing phase comprising the steps of:
defining a plurality of distributions of the records of the optimized training subset onto new training and testing subsets;
training and testing a new generation set of prediction algorithms using the new training and testing subsets;
assigning a fitness score to each prediction algorithm in the new generation of prediction algorithms;
defining a new optimized training subset and a new optimized testing subset;
identifying a new optimized training subset and a new optimized testing subset as the training and testing subsets corresponding to the prediction algorithm having the highest fitness score; and
employing the optimized testing subset as a validation set.

27. A computer medium for producing a microarray for genotyping, the computer medium comprising:
a computer comprising a central processing unit;
one or more memories, at least one of the one or more memories storing a database of experimentally determined data in which each record relates to a known clinical or experimental case of a sample population of cases, the data comprising a number of input variables corresponding to the presence/absence of a predetermined number of polymorphisms and/or mutations and/or equivalent genes of a number of theoretically probable relevant genes, said certain predetermined number of polymorphisms and/or genes forming a set, and the data further comprising one or more related output variables corresponding to the certain biological or pathologic condition of the clinical and experimental cases of the sample population;
at least one of the one or more memories storing a software program defining a number of theoretically relevant genes or alleles or polymorphisms relevant for a biologic condition, the software program comprising the steps of:

determining a selection of a subset of the set of certain predetermined number of polymorphisms and/or genes by testing the association of the genes or polymorphisms and the biological or pathological condition by mathematical tools comprising a prediction algorithm applied to the database;

defining a plurality of distributions of the database onto respective training and testing subsets;

training and testing a first generation set of prediction algorithms using the plurality of distributions of the database, each of said prediction algorithms being associated with a first different distribution of records of the database;

assigning a fitness score to each of the prediction algorithms;

feeding the set of prediction algorithms to an evolutionary algorithm which generates a set of one or more second generation prediction algorithms and assigns a fitness score to each;

continuing to feed each generational set of prediction algorithms to the evolutionary algorithm until a termination event occurs, wherein said termination event is at least one of:

a prediction algorithm generated with a fitness score equal to or exceeding a defined minimum value, the maximum fitness score of successive generational sets of prediction algorithms converging to a given value, or a certain number of generations having been generated;

selecting a prediction algorithm having a best fitness score; and using the distribution of database associated with said selected prediction algorithm in performing supervised learning, said supervised learning including training and testing of prediction algorithms to obtain a trained prediction algorithm;

generating a population of prediction algorithms, wherein each of said prediction algorithms is trained and tested according to a second different distribution of the records of the data set in the complete database onto a training data set and a testing data set, each second different distribution being created as one of a random or pseudorandom distribution, each prediction algorithm of said population being trained according to its own distribution of records of the training set and being validated in a blind way according its own distribution on the testing set, and a score reached by each prediction algorithm being calculated in the testing phase representing its fitness;

providing an evolutionary algorithm which combines the different models of distribution of the records of the complete data set in a training and in a testing set, which sets are represented each one by a corresponding prediction algorithm trained and tested on the basis of said training and testing data set according to the fitness score calculated in the previous step for the corresponding prediction algorithm, the fitness score of each prediction algorithm corresponding to one of the different distributions of the complete data set on the training and the testing data sets being the probability of evolution of each prediction algorithm or of each said distribution of the complete data set on the training and testing data sets;

repeating the evolution of the prediction algorithm generation for a finite number of generations or till the output of the genetic algorithm converges to a best solution and/or till the fitness value of at least some prediction algorithm related to an associated data records distribution has reached a desired value; and setting the data records distribution for the best solution as the optimized training and testing subsets for training and testing prediction algorithm; and an output system responsive to the received information.

28. A computer medium according to claim 27, wherein an optimization of the distribution of the records of the original database in a training dataset and in a testing dataset is carried out in one of a pre processing and a post processing phase.

* * * * *